US012565429B2

(12) United States Patent
Adachi et al.

(10) Patent No.: US 12,565,429 B2
(45) Date of Patent: *Mar. 3, 2026

(54) ELECTROMAGNETIC WAVE ABSORBING PARTICLES, ELECTROMAGNETIC WAVE ABSORBING PARTICLE DISPERSION LIQUID, AND METHOD FOR MANUFACTURING ELECTROMAGNETIC WAVE ABSORBING PARTICLES

(71) Applicant: SUMITOMO METAL MINING CO., LTD., Tokyo (JP)

(72) Inventors: Kenji Adachi, Chiba (JP); Satoshi Yoshio, Ehime (JP); Masao Wakabayashi, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 839 days.

This patent is subject to a terminal disclaimer.

(21) Appl. No.: 17/759,551

(22) PCT Filed: Jan. 28, 2021

(86) PCT No.: PCT/JP2021/003098
§ 371 (c)(1),
(2) Date: Jul. 27, 2022

(87) PCT Pub. No.: WO2021/153692
PCT Pub. Date: Aug. 5, 2021

(65) Prior Publication Data
US 2023/0052771 A1      Feb. 16, 2023

(30) Foreign Application Priority Data
Jan. 31, 2020      (JP) ................................. 2020-015756

(51) Int. Cl.
| | |
|---|---|
| *C09C 1/00* | (2006.01) |
| *C01G 41/00* | (2006.01) |
| *C09C 3/06* | (2006.01) |
| *G02B 5/20* | (2006.01) |

(52) U.S. Cl.
CPC .............. *C01G 41/006* (2013.01); *C09C 1/00* (2013.01); *C09C 3/063* (2013.01); *G02B 5/206* (2013.01); *C01P 2002/52* (2013.01); *C01P 2002/76* (2013.01); *C01P 2002/77* (2013.01); *C01P 2002/82* (2013.01); *C01P 2004/04* (2013.01); *C01P 2004/62* (2013.01); *C01P 2004/64* (2013.01); *C01P 2006/40* (2013.01)

(58) Field of Classification Search
None
See application file for complete search history.

(56) References Cited

U.S. PATENT DOCUMENTS

| | | |
|---|---|---|
| 2006/0178254 A1 | 8/2006 | Takeda et al. |
| 2010/0220388 A1 | 9/2010 | Suzuki et al. |
| 2015/0030802 A1 | 1/2015 | Chen et al. |
| 2015/0153478 A1 | 6/2015 | Takeda et al. |
| 2019/0077676 A1 | 3/2019 | Nakayama et al. |
| 2019/0161361 A1 | 5/2019 | Tsunematsu et al. |
| 2019/0225503 A1 | 7/2019 | Okada et al. |
| 2020/0170150 A1 | 5/2020 | Okada et al. |
| 2020/0198984 A1 | 6/2020 | Okada et al. |
| 2021/0087070 A1 | 3/2021 | Nakayama et al. |
| 2023/0052771 A1 | 2/2023 | Adachi et al. |

FOREIGN PATENT DOCUMENTS

| | | |
|---|---|---|
| CN | 105016392 | 11/2015 |
| CN | 109761282 | 5/2019 |
| EP | 3431565 | 1/2019 |
| EP | 3757632 | 12/2020 |
| JP | H09-107815 | 4/1997 |
| JP | 2003-029314 | 1/2003 |
| JP | 2013-173642 | 9/2013 |
| JP | 2016-083903 | 5/2016 |
| JP | 2019-142762 | 8/2019 |
| JP | 6743226 | 8/2020 |
| KR | 10-2011-0136274 | 12/2011 |
| KR | 10-1182194 | 9/2012 |
| WO | 2005/037932 | 4/2005 |
| WO | 2017/159791 | 9/2017 |
| WO | 2017/161423 | 9/2017 |
| WO | 2019/031243 | 2/2019 |
| WO | 2019/031246 | 2/2019 |
| WO | 2019/155996 | 8/2019 |
| WO | 2021/153692 | 8/2021 |

OTHER PUBLICATIONS

English Translation of JP6743226 (Year: 2020).*
Office Action mailed on Jul. 3, 2025 issued with respect to the related U.S. Appl. No. 17/757,794.
Nakamura Keisuke et al: "Monolayered Nanodots of Transition Metal Oxides", Journal of the American Chemical Society, vol. 135, No. 11, Mar. 7, 2013 (Mar. 7, 2013), pp. 4501-4508, XP093059376, ISSN: 0002-7863, DOI: 10.1021/ja400443a, Retrieved from the Internet: URL: https://pubs.acs.org/doi/pdf/10.1021/ja400443a, *p. 4501-p. 4505; figures*.
Miyauchi Masahiro et al: "Tungstate nanosheet ink as a photonless and electroless chromic device", Journal of Materials Chemistry C, vol. 2, No. 19, Jan. 1, 2014 (Jan. 1, 2014), pp. 3732-3737, XP093059338, GB, ISSN: 2050-7526, DOI: 10.1039/C3TC32513J, Retrieved from the Internet: URL: https://pubs.rsc.org/en/content/articlepdf/2014/tc/c3tc32513j> *p. 3732-p. 3736; figures*.

(Continued)

*Primary Examiner* — Tanisha Diggs

(74) *Attorney, Agent, or Firm* — IPUSA, PLLC

(57) ABSTRACT

Electromagnetic wave absorbing particles including cesium tungsten oxide represented by a general formula $Cs_xW_{1-y}O_{3-z}$ ($0.2 \leq x \leq 0.4$, $0 < y \leq 0.4$, and $0 < z \leq 0.46$) and having an orthorhombic crystal structure or a hexagonal crystal structure are provided.

13 Claims, 17 Drawing Sheets

(56) References Cited

OTHER PUBLICATIONS

Da Silva K. Pereira et al: "Vibrational properties of Cs 4 W 11 O 35 and Rb 4 W 11 O 35 systems: high pressure and polarized Raman spectra: Vibrational properties of Cs 4 W 11 O 35 and Rb 4 W 11 O 35 systems", Journal of Raman Spectroscopy, vol. 42, No. 3, Mar. 1, 2011 (Mar. 1, 2011), pp. 474-481, XP093059362, GB, ISSN: 0377-0486, DOI: 10.1002/jrs.2737, Retrieved from the Internet: URL: https://api.wiley.com/onlinelibrary/tdm/v1/articles/10.1002%2Fjrs.2737> *p. 474-p. 481; figures*.

Pereira Da Silva K. et al: "Temperature-dependent Raman scattering study on Cs4W11O35 and Rb4W11O35 systems", Journal of Solid State Chemistry, vol. 199, Mar. 1, 2013 (Mar. 1, 2013), pp. 7-14, XP093059369, US, ISSN: 0022-4596, DOI: 10.1016/j.jssc.2012.09.021, Retrieved from the Internet: URL: https://pdf.sciencedirectassets.com/272605/1-s2.0-S0022459612X0015X/1-s2.0-S0022459612006160/main.pdf?X-Amz-Security-Token=IQoJb3JpZ21uX2VjECYaCXVzLWVhc3QtMSJHMEUCIQD8sEUrJFePiCjJXZuM88qE4MAdLgJkSvyWXEQQO.

Jing-Xiao Liu et al., "Materials Characterization", 2013, 84, pp. 182-187, fig. 1, table 1, Results and Discussion.

Qiming Zhong et al., "Thin Solid Films", 1991, 205, pp. 85-88, fig. 1-4, tables 1-2.

International Search Report mailed on Mar. 16, 2021 with respect to PCT/JP2020/048402.

Extended European Search Report mailed on May 23, 2023 with respect to the corresponding European patent application No. 20906352.8.

Kumagai N et al: "Thermodynamics and kinetics of electrochemical intercalation of Lithium into Li0.50WO3.25 with a hexagonal tungsten bronze structure", Solid State Ionics, col. 98, No. 3-4, 1997, pp. 159-166, XP004126142.

Wagata Hajime et al: "Fabrication of Combined One-Dimensional and Three-Dimensional Structure of Potassium Tungstate Crystal Layers by Spray Deposition with Polystyrene Colloidal Crystal Templates", Crystal Growth & Design, vol. 13, 2013, pp. 3294-3298, XP055945310.

International Search Report issued for related International Patent Application No. PCT/JP2021/003100 on Apr. 20, 2021.

Extended European Search Report mailed on Nov. 16, 2023 issued with respect to the corresponding European patent application No. 21747227.3.

Zeng Xianzhe et al: "The preparation of a high performance near-infrared shielding Cs × WO 3 / SiO 2 composite resin coating and research on its optical stability under ultraviolet illumination", Journal of Materials Chemistry C, vol. 3, No. 31, Jan. 1, 2015 (Jan. 1, 2015), pp. 8050-8060, XP055774005, GB ISSN: 2050-7526, DOI: 10.1039/C5TC01411E, Retrieved from the Internet: URL: <https://pubs.rsc.org/en/content/articlepdf/2015/tc/c5tc01411e>.

K. Adachi and T. Asahi, "Activation of plasmons and polarons in solar control cesium tungsten bronze and reduced tungsten oxide nanoparticles," Journal of Material Research, vol. 27, 965-970 (Mar. 28, 2012).

S. Yoshio and K. Adachi, "Polarons in reduced cesium tungsten bronzes studied using the DFT + U method," Materials Research Express, vol. 6, 026548, 1-14 (2019).

K. Machida, M. Okada, and K. Adachi, "Excitations of free and localized electrons at nearby energies in reduced cesium tungsten bronze nanocrystals," Journal of Applied Physics, vol. 125, 103103 (Mar. 12, 2019).

S. F. Solodovnikov, N.V. Ivannikova, Z.A. Solodovnikova, E.S. Zolotova, "Synthesis and X-ray diffraction study of potassium, rubidium, and cesium polytungstates with defect pyrochlore and hexagonal tungsten bronze structures," Inorganic Materials, vol. 34, No. 8, 845-853 (1998).

M. Okada, K. Ono, S. Yoshio, H. Fukuyama and K. Adachi, "Oxygen vacancies and pseudo Jahn-Teller destabilization in cesium-doped hexagonal tungsten bronzes," Journal of American Ceramic Society, vol. 102, 5386-5400 (2019).

S. Yoshio, M. Okada, K. Adachi, "Destabilization of Pseudo Jahn-Teller Distortion in Cesium-doped hexagonal tungsten bronzes", J. Appl. Phys., vol. 124, 063109-1-8 (Aug. 14, 2018).

International Search Report mailed on Apr. 6, 2021 with respect to PCT/JP2021/003098.

Yamada, H. et al., "Lithium insertion to ReO3-type metastable phase in the Nb2O5-WO3 system", Solid State Ionics, 2001, 140, 249-255 entire text.

Yoshio, S. et al., "Cesium polytungstates with blue-tint-tunable near-infrared absorption", RSC Advances, Mar. 11, 2020, 10, 10491-10501. abstract, II Experimental, III Results and discussion.

Informal Comments filed on Aug. 27, 2021 in response to the Written Opinion of the International Searching Authority with respect to PCT/JP2021/003098.

S. Nakakura, A. F. Arif, K. Machida, K. Adachi, T. Ogi, "Cationic Defect Engineering for Controlling the Infrared Absorption of Hexagonal Cesium Tungsten Bronze Nanoparticles", Inorganic Chemistry, 58, 9101-9107 (2019).

International Search Report issued for related International Patent Application No. PCT/JP2021/037923 on Nov. 30, 2021.

* cited by examiner

ELECTROMAGNETIC WAVE ABSORBING PARTICLES, ELECTROMAGNETIC WAVE ABSORBING PARTICLE DISPERSION LIQUID, AND METHOD FOR MANUFACTURING ELECTROMAGNETIC WAVE ABSORBING PARTICLES

TECHNICAL FIELD

The present invention relates to electromagnetic wave absorbing particles, an electromagnetic wave absorbing particle dispersion liquid, and a method for manufacturing electromagnetic wave absorbing particles.

BACKGROUND ART

According to the fifth edition of the Physical and Chemical Dictionary, "electromagnetic waves with wavelengths in the range of about 1 nm to 1 mm are called light." This range of wavelengths includes the visible light region and the infrared region.

Near-infrared rays contained in sunlight penetrate window materials and the like and enter rooms, thereby raising the surface temperature of the walls and floors of the rooms and also raising the indoor temperature. In order to make an indoor thermal environment comfortable, light shielding materials have been conventionally used for window materials to block near-infrared rays entering through windows such that the indoor temperature does not increase.

As a light shielding member used for a window material and the like, Patent Document 1 proposes a light shielding film that contains black fine powders including inorganic pigments such as carbon black and titanium black or including organic pigments such as aniline black.

Further, Patent Document 2 discloses a heat-insulating sheet formed as a woven knitted fabric using a strip-shaped film having infrared reflection properties and a strip-shaped film having infrared absorption properties as a warp and a weft, respectively. Further, Patent Document 2 describes that a synthetic resin film is subjected to aluminum vapor deposition and is further laminated as a strip-shaped film having infrared reflection properties.

The applicant discloses, in Patent Document 3, a fine particle dispersion of infrared-shielding material, which is formed by dispersing fine particles of infrared-shielding material in a medium. The fine particle dispersion of infrared-shielding material contains tungsten oxide fine particles and/or composite tungsten oxide fine particles. The dispersed particle diameter of the fine particles of infrared-shielding material is greater than or equal to 1 nm and less than or equal to 800 nm.

RELATED-ART DOCUMENTS

Patent Documents

Patent Document 1: Japanese Laid-open Patent Publication No. 2003-029314
Patent Document 2: Japanese Laid-open Patent Publication No. 9-107815
Patent Document 3: International Publication Pamphlet No. WO2005/037932

Non-Patent Documents

Non-Patent Document 1: K. Adachi and T. Asahi, "Activation of plasmons and polarons in solar control cesium tungsten bronze and reduced tungsten oxide nanoparticles," Journal of Material Research, Vol. 27, 965-970 (2012)
Non-Patent Document 2: S. Yoshio and K. Adachi, "Polarons in reduced cesium tungsten bronzes studied using the DFT+U method," Materials Research Express, Vol. 6, 026548 (2019)
Non-Patent Document 3: K. Machida, M. Okada, and K. Adachi, "Excitations of free and localized electrons at nearby energies in reduced cesium tungsten bronze nanocrystals," Journal of Applied Physics, Vol. 125, 103103 (2019)
Non-Patent Document 4: S. F. Solodovnikov, N. V. Ivannikova, Z. A. Solodovnikova, E. S. Zolotova, "Synthesis and X-ray diffraction study of potassium, rubidium, and cesium polytungstates with defect pyrochlore and hexagonal tungsten bronze structures," Inorganic Materials, Vol. 34, 845-853 (1998)
Non-Patent Document 5: M. Okada, K. Ono, S. Yoshio, H. Fukuyama and K. Adachi, "Oxygen vacancies and pseudo Jahn-Teller destabilization in cesium-doped hexagonal tungsten bronzes," Journal of American Ceramic Society, Vol. 102, 5386-5400 (2019)
Non-Patent Document 6: S. Yoshio, M. Okada, K. Adachi, "Destabilization of Pseudo Jahn-Teller Distortion in Cesium-doped hexagonal tungsten bronzes", J. Appl. Phys., vol. 124, 063109-1-8 (2018).

SUMMARY OF THE INVENTION

Problem to be Solved by the Invention

The above-described Patent Document 3 discloses tungsten oxide fine particles and/or composite tungsten oxide fine particles as infrared-shielding material fine particles. A transmission film in which tungsten oxide fine particles are dispersed exhibits a blue coloration, and the degree of blue coloration increases as the additive amount increases.

However, in recent years, in applications such as automotive glass and photothermal conversion materials, it is desired for the transmission color of such a transmission film to be a neutral color with no blue coloration, while increasing the near-infrared absorption and also reducing the solar transmittance.

If a blue material such as the above-described transmission film in which tungsten oxide fine particles are dispersed is used as a base material, hues obtained by tinting glass with various pigments or dyes are limited. In particular, it is difficult to obtain a yellowish transmission color, which is a complementary color.

Further, a pure white coloration is desirable for applications such as photothermal conversion materials, specifically, adhesion of transparent resin members via photothermal conversion. However, it is difficult for materials such as tungsten oxide as described above to exhibit a pure white coloration.

Conversely, if the transmission color of a transmission film (a dispersion) or a dispersion liquid, in which composite tungsten oxide particles are dispersed, is set to a neutral color, that is, a transparent color, its application can be extended. However, there has been no report on composite tungsten oxide that can exhibit a neutral color while reducing the solar transmittance when dispersed in a dispersion or a dispersion liquid.

In view of the above, it is an object of an aspect of the present invention to provide electromagnetic wave absorbing particles that can exhibit a more neutral transmission color while reducing the solar transmittance when dispersed.

Means to Solve the Problem

According to an aspect of the present invention, electromagnetic wave absorbing particles containing cesium tungsten oxide represented by a general formula $Cs_xW_{1-y}O_{3-z}$ ($0.2 \leq x \leq 0.4$, $0 < y \leq 0.4$, and $0 < z \leq 0.46$) and having an orthorhombic crystal structure or a hexagonal crystal structure are provided.

Effects of the Invention

According to an aspect of the present invention, electromagnetic wave absorbing particles capable of exhibiting a more neutral transmission color while reducing the solar transmittance when dispersed can be provided.

MODE FOR CARRYING OUT THE INVENTION

Figure 1A:
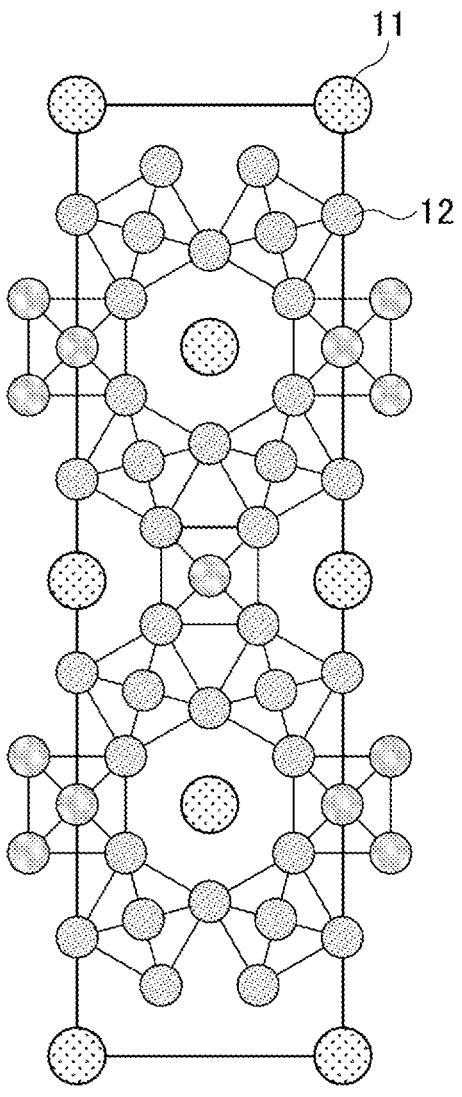
FIG. 1A is a drawing illustrating a crystal structure of cesium tungsten oxide ($Cs_4W_{11}O_{35}$)
Figure 1A:
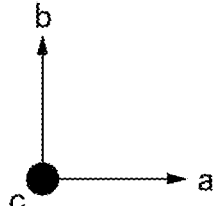

In the following, embodiments of the present invention will be described with reference to the drawings. However, the present invention is not limited to the following embodiments, and various modifications and substitutions may be made to the following embodiments without departing from the scope of the present invention.

[Electromagnetic Wave Absorbing Particles, and Method for Manufacturing Electromagnetic Wave Absorbing Particles]

Electromagnetic wave absorbing particles, and a method for manufacturing electromagnetic wave absorbing particles according to an embodiment will be described.

(Electromagnetic Wave Absorbing Particles)

Conventionally, the transmission color of cesium-doped hexagonal tungsten bronze nanoparticles used as electromagnetic wave absorbing particles is defined by the imaginary part ($\varepsilon_2$) of its dielectric function (experimentally obtained $\varepsilon_2$ is described in Non-Patent Document 1) and the band structure (Non-Patent Document 2).

In the visible light energy region (1.6 eV to 3.3 eV), the band gap of cesium-doped hexagonal tungsten bronze (hereinafter abbreviated as Cs-HTB) is sufficiently large. In addition, electronic transitions between d-d orbitals of tungsten are prohibited by Fermi's golden rule. Therefore, the probability of electronic transitions is reduced and $\varepsilon_2$ takes a small value. Note that $\varepsilon_2$ represents the absorption of a photon by an electron. Thus, if $\varepsilon_2$ is small at visible frequencies, visible light transmission occurs. However, near the blue wavelengths, which are the shortest wavelengths in the visible light region, there is absorption due to inter-band transition, and near the red wavelengths, which are the longest wavelengths in the visible light region, localized surface plasmon resonance (LSPR) absorption and polaronic electronic transition absorption occur (Non-Patent Document 3). Thus, there are restrictions in terms of light transmission.

As described above, because the band gap of Cs-HTB is sufficiently large, inter-band transition is larger than light energy of the blue wavelengths, thus resulting in high blue transmission. Conversely, in the red wavelength region, since Cs-HTB has a large number of conduction electrons, LSPR absorption and polaronic absorption increase, and at the same time, the absorption wavelength is shifted toward the red wavelength region, thus decreasing the transmission. Therefore, the transmission color of a Cs-HTB nanoparticle dispersion film appears blue.

That is, by increasing the absorption in the blue region and increasing the transmission in the red region, the transmission color of Cs-HTB, which is a bluish color, can be neutralized. For this purpose, it is preferable to shift the position of absorption due to inter-band transition to the low-energy side, and is also preferable to make LSPR absorption and polaronic absorption weak so as to be shifted to the low-energy side.

In order to make LSPR absorption and polaronic absorption weak, it is effective to reduce the amount of free electrons and the amount of trapped electrons contained in a material.

An increase in the absorption in the blue region as described above is achieved based on materials with different energy-band structures such as those having band gaps on the low energy side. Further, the transmission in the red region can be controlled by reducing the amount of cesium ions ($Cs^+$) and oxygen vacancies ($V_o$) from which free electrons and trapped electrons originate.

Based on the above discussion, the inventors of the present invention conducted various investigations on cesium tungsten oxide, which is an oxide containing cesium (Cs) and tungsten (W). As a result, the inventors found that, when electromagnetic wave absorbing particles containing cesium tungsten oxide, which are obtained by reducing a crystalline powder of a cesium tungsten oxide precursor $nCs_2O.mWO_3$ that includes Cs and W (n and m are integers, and $3.6 \leq m/n \leq 9.0$), are dispersed in an electromagnetic wave absorbing particle dispersion such as a transmission film or an electromagnetic wave absorbing particle dispersion liquid, the color tone of the electromagnetic wave absorbing particle dispersion or the electromagnetic wave absorbing particle dispersion liquid becomes less bluish and becomes neutralized.

It is considered that the above-described electromagnetic wave absorbing particles are neutralized by using, as the starting material, a compound with low blue transmission and having a narrower band gap than that of hexagonal Cs-HTB, reducing the compound so as to increase the amount of $V_o$, and gradually increasing LSPR absorption and polaronic absorption within an acceptable range to optimize red light transmittance.

In the above-described cesium tungsten oxide precursor $nCs_2O.mWO_3$ including Cs, charges of Cs and W, which are positive elements, are neutralized by O, and thus, $nCs_2O.mWO_3$ is a non-conductor. For a compound in the $WO_3$—$Cs_2O$ line such as $Cs_2W_7O_{22}$, $Cs_6W_{20}O_{63}$, $Cs_2W_6O_{19}$, $Cs_4W_{11}O_{35}$, $Cs_6W_{11}O_{36}$, or $Cs_2W_3O_{10}$, the position of the Fermi energy, $E_f$, is between the valence band and the conduction band as the valences are balanced, and thus, the compound is a non-conductor. With a Cs/W ratio (molar ratio) of 0.2 or more, Cs having a large ionic radius is introduced. Thus, a basic skeleton formed by W—O octahedra is a hexagonally symmetrical structure having a large hexagonal void, or is a crystal structure in which plane defects including W defects (tungsten defects) are created in the atomic arrangement of a hexagonal structure having a large hexagonal void or a cubic structure (pyrochlore structure), thereby causing the crystal symmetry to reduce to orthorhombic or monoclinic.

For example, for $2Cs_2O.11WO_3$, in the hexagonal arrangement of W—O octahedra, which is similar to that of hexagonal tungsten bronze, W- and O-deficient planes are inserted in the hexagonal (110) plane (=the orthorhombic (010) plane) with a b/8 pitch of an orthorhombic unit cell, and thus, $2Cs_2O.11WO_3$ is regarded as orthorhombic in the model of Solodovnikov 1998 (Non-Patent Document 4). For the cesium tungsten oxide precursor $nCs_2O.mWO_3$ (n and m are integers, and $3.6 \leq m/n \leq 9.0$), the band gap is narrower than that of Cs-HTB, and thus, blue transmission is low. However, it was found that its entire structure is gradually changed to the hexagonal structure of tungsten bronze by heating and reduction, and in this process, the band structure is changed. As a result, the band gap is widened and the absorption of blue wavelengths is reduced, thereby increasing the transmission of blue wavelengths. In addition, as the reduction of the cesium tungsten oxide precursor proceeds, electrons are gradually injected into the conduction band, and the cesium tungsten oxide precursor becomes a conductor, and the band gap is gradually widened by the Burstein-Moss effect, thereby further increasing the transmission of blue wavelengths.

When an orthorhombic crystal is changed to a hexagonal crystal by heating and reduction, plane defects including W defects in the orthorhombic crystal are gradually eliminated and a hexagonal skeleton of W—O octahedra is formed. The plane defects including W defects are present in the $(010)_{ORTH}$ plane, but this plane is inherited by the hexagonal prism plane $\{100\}_{HEX}$, i.e., $[(100)_{HEX}, (010)_{HEX},$ and $(110)_{HEX}]$. Therefore, a hexagonal crystal is gradually formed with defects on the $\{100\}_{HEX}$ plane. Because the $\{100\}_{HEX}$ plane includes the defects, the hexagonal crystal at this time is deviated from the perfect hexagonal symmetry, and is considered as a pseudo-hexagonal crystal. Accordingly, during heating and reduction, a crystal structure changes from orthorhombic to pseudo-hexagonal to hexagonal. At this time, it is considered that the plane defects including W defects in the $(010)_{ORTH}$ plane included in the orthorhombic crystal are inherited by the $\{100\}_{HEX}$ plane, gradually decreased, and ultimately eliminated.

As the crystal structure changes during heating and reduction, the electronic structure also changes. Elimination of W defects causes a large amount of electrons to be injected into a material. In an orthorhombic crystal, outer-shell electrons of Cs are spent to neutralize O, and the overall charge is thus neutral. However, when W defects are reduced and the orthorhombic crystal changes to a pseudo-hexagonal crystal, six outer-shell electrons per W atom are spent to neutralize O, thereby causing outer-shell electrons of Cs to be injected into W-5d orbitals at the bottom of the conduction band and become free electrons. The free electrons provide near-infrared absorption by LSPR absorption. Heating and reduction act to generate $V_o$ at the same time. The generation of $V_o$ proceeds in random sites. When $V_o$ is generated, the charge of W atoms adjacent to the $V_o$ becomes excessive, and localized electrons bound to $W^{5+}$ are generated (Non-Patent Document 2). The localized electrons make transitions to the vacant level at the top of the conduction band, thereby resulting in polaronic absorption. However, some of the localized electrons are excited into free electron orbitals, thereby resulting in LSPR absorption (Non-Patent Document 3). The peak wavelengths of both the absorption by the free electrons and the absorption by the bound electrons are in the near-infrared region. Therefore, the tail of the absorption extends to the red region, thus reducing the transmission of red wavelengths. As the amounts of free electrons and bound electrons increase, that is, as the degree of reduction increases, the LSPR absorption and the polaronic absorption shift to higher wavelengths and the absorption amount increases. Thus, the transmission of red wavelengths is reduced.

Accordingly, the transmission color of blue can be neutralized by reducing the crystalline powder of the cesium tungsten oxide precursor $nCs_2O.mWO_3$ (n and m are integers, and $3.6 \leq m/n \leq 9.0$) and adjusting the degree of reduction.

The above-described electromagnetic wave absorbing particles according to the present embodiment can be produced by heating the crystalline powder of the cesium tungsten oxide precursor $nCs_2O.mWO_3$, including Cs and W, at a temperature in the range of 650° C. to 950° C. in a reducing atmosphere. In the formula representing the cesium tungsten oxide, preferably, n and m are integers, and $3.6 \leq m/n \leq 9.0$ is satisfied.

That is, as the electromagnetic wave absorbing particles, particles obtained by heating and reducing the crystalline powder of the cesium tungsten oxide precursor $nCs_2O.mWO_3$ (n and m are integers, and $3.6 \leq m/n \leq 9.0$), including cesium and tungsten, at a temperature in the range at 650° C. to 950° C. in a reducing gas atmosphere can be used.

In order to obtain entirely or partially hexagonal tungsten bronze by heating and reduction, the above m/n value needs to be greater than or equal to 3.6 and less than or equal to 9.0. If the value is less than 3.6, the phase becomes a cubic pyrochlore phase after heating and reduction. In addition, a high degree of coloration is exhibited, and near-infrared absorption does not occur. If the value is greater than 9.0, the phase is separated into a hexagonal tungsten bronze phase and a tungsten trioxide phase after heating and reduction, and a near-infrared absorption effect is significantly reduced. The above-described cesium tungsten oxide precursor is more preferably $Cs_4W_{11}O_{35}$, where m/n=5.5. That is, as the electromagnetic wave absorbing particles, it is more preferable to use particles obtained by heating and reducing a cesium tungsten oxide precursor including a $Cs_4W_{11}O_{35}$ phase as a main phase at a temperature in the range of 650° C. to 950° C. in a reducing gas atmosphere. By using the electromagnetic wave absorbing particles obtained by high-temperature reduction of $Cs_4W_{11}O_{35}$, a large near-infrared absorption effect can be obtained and a less-bluish transmission color can be exhibited when the electromagnetic wave absorbing particles are dispersed. As used herein, the main phase refers to a phase that is most included in terms of mass ratio.

As described above, the heating temperature at which cesium tungsten oxide is reduced is preferably higher than or equal to 650° C. and lower than or equal to 950° C. By setting the temperature to 650° C. or higher, the crystal structure change from orthorhombic to hexagonal can be sufficiently advanced, and a near-infrared absorption effect can be enhanced. In addition, by setting the temperature to 950° C. or lower, the speed of the crystal structure change can be maintained appropriately, and the appropriate crystal state and electronic state can be easily controlled. Note that if the heating temperature is higher than 950° C. and excessive reduction is performed, lower oxides such as metal W and $WO_2$ may be produced, which is not preferable.

The electromagnetic wave absorbing particles according to the present embodiment can contain cesium tungsten oxide represented by a general formula $Cs_xW_{1-y}O_{3-z}$ ($0.2 \leq x \leq 0.4$, $0 < y \leq 0.4$, and $0 < z \leq 0.46$) and having an orthorhombic crystal structure or a hexagonal crystal structure. When the cesium tungsten oxide contained in the electromagnetic wave absorbing particles satisfies the above-described general formula, W defects and oxygen vacancies $V_o$ are within appropriate ranges. In addition, an electromagnetic wave absorbing particle dispersion or the like in which the electromagnetic wave absorbing particles are dispersed can exhibit a neutral transmission color while reducing the solar transmittance.

Note that the electromagnetic wave absorbing particles may contain composite tungsten oxide described above. However, unavoidable impurities may be included in the manufacturing process in this case as well.

Conventionally known tungsten bronze for electromagnetic wave absorption has a hexagonal crystal structure. Conversely, the composite tungsten oxide contained in the electromagnetic wave absorbing particles according to the present embodiment can have an orthorhombic crystal structure or a hexagonal crystal structure. Note that the hexagonal crystal structure includes a pseudo-hexagonal crystal structure.

The composite tungsten oxide contained in the electromagnetic wave absorbing particles preferably has linear or planar defects in one or more planes selected from the orthorhombic (010) plane, the {100} plane, which is the hexagonal prism plane, and the (001) plane, which is the hexagonal basal plane. The above defects include stacking faults based on displacement between planes, and disturbances in the in-plane arrangement or positions of Cs and W atoms, which often results in streaks in electron diffraction spots. The {100} plane, which is the hexagonal prism plane, refers to the (100) plane, the (010) plane, and the (110) plane. Defects related to composite tungsten oxide, that is, lattice defects are accompanied by at least W defects, specifically partial W defects. The W defects result in electrons missing in the crystal, and act as one of the essential causes of the neutralization of a blue color tone.

The cesium tungsten oxide has defects, and the defects can include tungsten defects as described above.

Also, in W—O octahedra forming an orthorhombic crystal structure or a hexagonal crystal structure, which is a basic structure of the cesium tungsten oxide, part of O can be randomly removed. As described above, oxygen vacancies $V_o$ in the octahedra are randomly introduced, and in the known hexagonal tungsten bronze $Cs_{0.32}WO_{3-y}$, it is known that y=0.46 or up to 15% of all O lattice points is vacant (Non-Patent Document 5). In the general formula $Cs_xW_{1-y}O_{3-z}$ representing the cesium tungsten oxide contained in the electromagnetic wave absorbing particles according to the present embodiment, the amount of $V_o$ can be included up to z=0.46. That is, z can be less than or equal to 0.46.

The lattice constants of cesium tungsten composite oxide correspond to the defect amount in the crystal lattice, or the composition and crystallinity. For these variables, variations are observed in values of the a-axis, but values of the c-axis correspond relatively well to the lattice defect amount or optical properties. Accordingly, the c-axis length of the cesium tungsten oxide contained in the electromagnetic wave absorbing particles according to the present embodiment is preferably 7.560 Å or more to 7.750 Å or less when expressed in hexagonal terms. By including the c-axis length of the cesium tungsten oxide in the above-described range when expressed in hexagonal terms, a near-infrared absorption effect can be sufficiently improved, and the visible light transmission can be particularly improved. Note that if the cesium tungsten oxide has a hexagonal crystal structure, conversion is not necessary, and the c-axis length of the hexagonal crystal structure is the c-axis length when expressed in hexagonal terms.

The cesium tungsten oxide contained in the electromagnetic wave absorbing particles according to the present embodiment is often identified as having a mixed-phase of an orthorhombic phase and a hexagonal phase when diffraction patterns are measured by an X-ray powder diffraction method. For example, when the raw material of $Cs_4W_{11}O_{35}$ is reduced, a mixed-phase of the orthorhombic $Cs_4W_{11}O_{35}$ phase and the hexagonal $Cs_{0.32}WO_3$ phase is identified. In this case, the lattice constants of each of the phases are obtained by the Rietveld analysis or the like, and orthorhombic lattice constants can be converted into hexagonal lattice constants. As described above, an orthorhombic crystal is a hexagonal crystal with lattice defects. Thus, the orthorhombic lattice constants can be converted into hexagonal lattice constants by using an appropriate lattice-compatible model. Specifically, for conversions between orthorhombic lattice constants and hexagonal lattice constants, the formula $4a_{orth}^2 + b_{orth}^2 = 64a_{hex}^2 = 64b_{hex}^2$, $C_{orth} = C_{hex}$ can be extracted from the geometric relationship for the model of Solodovnikov 1998 (Non-Patent Document 4). By the above formula, all orthorhombic lattice constants can be expressed in hexagonal terms. In the above formula, $a_{orth}$, $b_{orth}$, and $c_{orth}$ mean the lengths of the a-axis, the b-axis, and the c-axis of an orthorhombic crystal. Further, $a_{hex}$, $b_{hex}$, and $c_{hex}$ mean the lengths of the a-axis, the b-axis, and the c-axis of a hexagonal crystal.

In the cesium tungsten oxide contained in the electromagnetic wave absorbing particles according to the present embodiment, part of Cs may be substituted with an additive element. In this case, the additive element preferably includes one or more elements selected from Na, Tl, In, Li, Be, Mg, Ca, Sr, Ba, Al, and Ga.

The above-described additive element(s) have electron donation properties, and support electron donation to the conduction band of the W—O octahedron skeleton at the Cs site.

The average particle diameter of the electromagnetic wave absorbing particles according to the present embodiment is not particularly limited, and is preferably 0.1 nm or more and 200 nm or less. By setting the average particle diameter of the electromagnetic wave absorbing particles to 200 nm or less, the localized surface plasmon resonance becomes stronger, and thus, near-infrared absorption properties can be particularly enhanced. That is, the solar transmittance can be particularly suppressed. In addition, by setting the average particle diameter of the electromagnetic wave absorbing particles to 0.1 nm or more, it becomes industrially easier to manufacture the particles. Further, the particle diameter is closely related to the color of an electromagnetic wave absorbing particle dispersion, which is a dispersion light-transmitting film in which the electromagnetic wave absorbing particles are dispersed. In the particle diameter range in which Mie scattering dominates, as the particle diameter decreases, scattering of short wavelengths in the visible light region decreases. Therefore, by increasing the particle diameter, a blue color tone can be suppressed. However, if the particle diameter exceeds 100 nm, an increase in the haze of the film due to light scattering would not be negligible. If the particle diameter exceeds 200 nm, the generation of surface plasmons would be suppressed and LSPR absorption would be excessively reduced in addition to an increase in the haze of the film.

The average particle diameter of the electromagnetic wave absorbing particles can be confirmed from the median diameter of a plurality of electromagnetic wave absorbing particles measured from transmission electron microscope images, or can be confirmed from a dispersed particle diameter measured by a particle size measuring device based on dynamic light scattering in a dispersion liquid.

Note that, for example, as in the case of automotive windshields, for an application in which transparency in the visible light region is important, it is preferable to further consider a decrease in scattering caused by the electromagnetic wave absorbing particles. If the decrease in scattering is important, the average particle diameter of the electromagnetic wave absorbing particles is particularly preferably less than or equal to 30 nm.

The average particle diameter means a particle diameter at an integrated value of 50% in the particle size distribution, and the average particle diameter has the same meaning in other parts in the present specification. As a method of measuring the particle size distribution to calculate the average particle diameter, for example, direct measurement of the particle diameter for each particle by using a transmission electron microscope may be used.

Further, surface treatment may be applied to the electromagnetic wave absorbing particles for purposes of surface protection, durability improvement, oxidation protection, water resistance improvement, and the like. Although the specific contents of surface treatment are not particularly limited, for example, the surfaces of the electromagnetic wave absorbing particles according to the present embodiment can be modified with a compound containing one or more elements selected from Si, Ti, Zr, and Al. As the compound containing one or more elements selected from Si, Ti, Zr, and Al, one or more of oxide, nitride, carbide, and the like can be used.

The band structures of cesium tungsten oxide and a cesium tungsten oxide precursor will be described.

As described above, a solar shielding material having a transmission color close to neutral can be obtained by reducing $nCs_2O.mWO_3$ (n and m are integers, and $3.6 \leq m/n \leq 9.0$) at a high temperature. It is considered that, at the time of high-temperature reduction, the formation of a hexagonal crystal structure, including the elimination of W defects, and the generation of $V_o$ cause electrons to be injected into the conduction band, and as a result, near-infrared absorption occurs. Such electronic structure changes are supported by first-principles calculations.

Figure 1B:
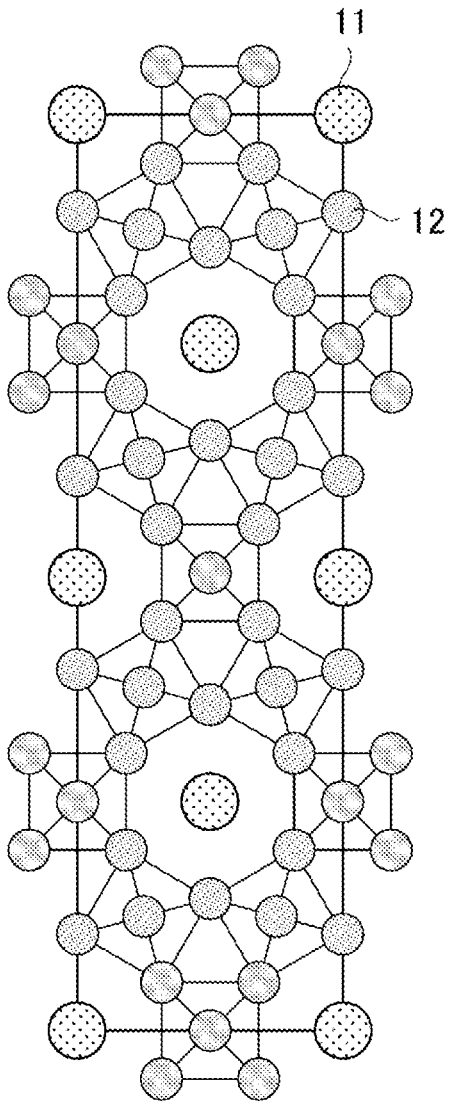
FIG. 1B is a drawing illustrating a crystal structure of cesium tungsten oxide ($Cs_4W_{12}O_{33}$)
Figure 1B:
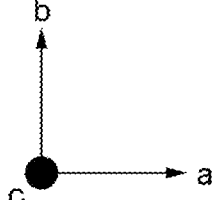

FIG. 1A illustrates a crystal structure of $Cs_4W_{11}O_{35}$. Further, FIG. 1B illustrates a crystal structure of $Cs_4W_{12}O_{36}$ that is $Cs_{0.33}WO_3$. In FIG. 1A and FIG. 1B, cesium 11 and oxygen 12 are depicted. Note that atoms of the same type have the same hatching. Tungsten is located in an octahedron formed by oxygen 12, and is thus not depicted in FIG. 1A and FIG. 1B. In FIG. 1B, $Cs_{0.33}WO_3$ is reoriented in an orthorhombic basis for comparison with $Cs_4W_{11}O_{35}$ in FIG. 1A.

The crystal structure of $Cs_4W_{11}O_{35}$ in FIG. 1A is that of $Cs_4W_{12}O_{36}$ in FIG. 1B in which W and O are regularly removed.

Figure 2A:
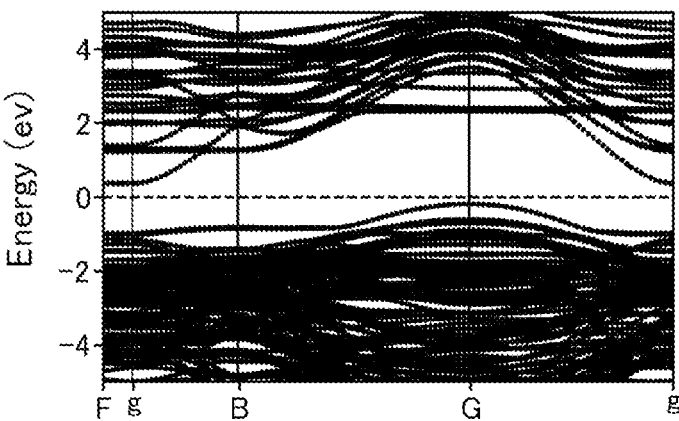
FIG. 2A is a drawing illustrating an energy band structure of the cesium tungsten oxide ($Cs_4W_{11}O_{35}$)
Figure 2B:
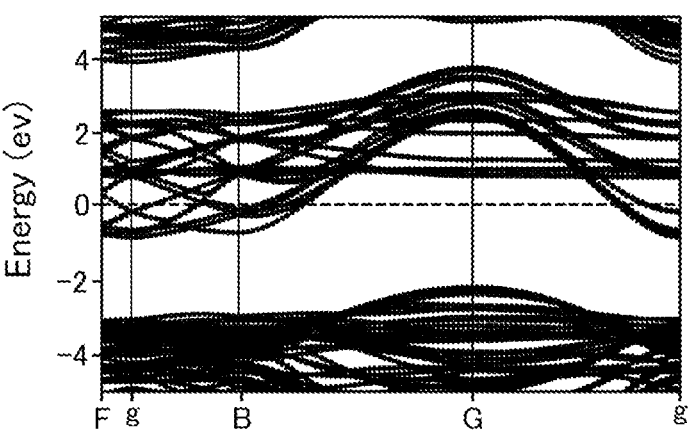
FIG. 2B is a drawing illustrating an energy band structure of cesium tungsten oxide ($Cs_4W_{12}O_{33}$)

FIG. 2A and FIG. 2B illustrate the band structures of cesium tungsten oxide having the crystal structures of FIG. 1A and FIG. 1B, respectively. Further, based on $Cs_4W_{12}O_{36}$ of FIG. 1B, FIG. 2C and FIG. 2D respectively illustrate the band structure of $Cs_4W_{11}O_{36}$ in which one W is removed and the band structure of $Cs_6W_{17}O_{54}$ in which one W is removed and the cell is made 1.5 times larger along the b-axis direction.

The band structure of $Cs_4W_{11}O_{35}$ illustrated in FIG. 2A is similar to the band structure of $Cs_4W_{12}O_{36}$ illustrated in FIG. 2B. However, in the former case, the Fermi energy ($E_F$) is located in the band gap, and in the latter case, the $E_F$ is located at the bottom of the conduction band. Accordingly, $Cs_4W_{11}O_{35}$ is an insulator and $Cs_4W_{12}O_{36}$ is a conductor. In $Cs_4W_{11}O_{35}$, one W and one O are removed from $Cs_4W_{12}O_{36}$ per unit cell. In $Cs_4W_{12}O_{36}$ in which W and O are fully arranged, it is considered that a hexagonal $WO_3$ network is formed and Cs electrons are injected into the W-5d orbitals, and thus, a conducting property is conferred (Non-Patent Document 6).

Figure 2C:
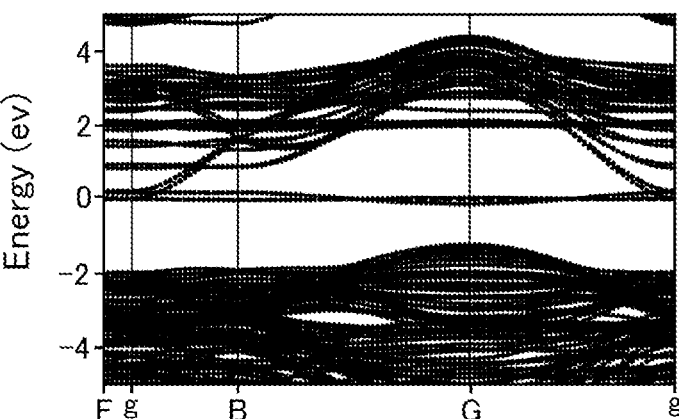
FIG. 2C is a drawing illustrating an energy band structure of cesium tungsten oxide ($Cs_4W_{11}O_{36}$)

$Cs_4W_{11}O_{36}$ illustrated in FIG. 2C is a structure in which one W is removed from $Cs_4W_{12}O_{36}$ illustrated in FIG. 2B.

Figure 2D:
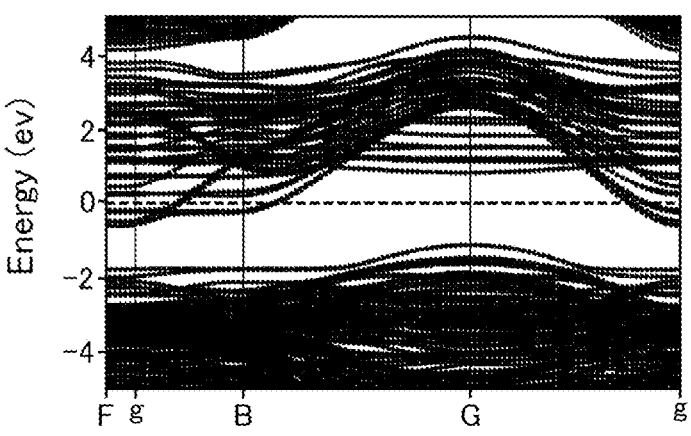
FIG. 2D is a drawing illustrating an energy band structure of cesium tungsten oxide ($Cs_6W_{17}O_{54}$)

$Cs_6W_{17}O_{54}$, that is, $3Cs_2O.17WO_3$ in FIG. 2D, is a structure in which one W is removed from $Cs_4W_{12}O_{36}$, that is, $Cs_6W_{18}O_{54}$ in FIG. 2B while maintaining charge neutrality.

The amount of W defect decreases in the order of FIG. 2A, FIG. 2D, and FIG. 2B, but the $E_F$ gradually increases toward the bottom of the conduction band. Further, W electrons are injected into the W-5d orbitals, and thus conductive electrons increase and near-infrared absorption increases. A detailed calculation example has already been reported in which O is deficient in $Cs_4W_{12}O_{36}$, and it is known that free electrons and localized electrons are significantly increased with the introduction of localized orbitals to the bottom of the conduction band (Non-Patent Document 2).

An experimentally obtained pseudo-hexagonal crystal (an intermediate structure in the middle of a phase transition between an orthorhombic crystal and a hexagonal crystal) is considered to be in an electron state in which the above elements are mixed. That is, as reduction progresses, the formation of a hexagonal crystal structure, including the elimination of W defects, and the generation of $V_o$ cause electrons to be gradually injected into the conduction band, and the Fermi energy ($E_F$) rises from the band gap to the bottom of the conduction band.

Figure 3A:
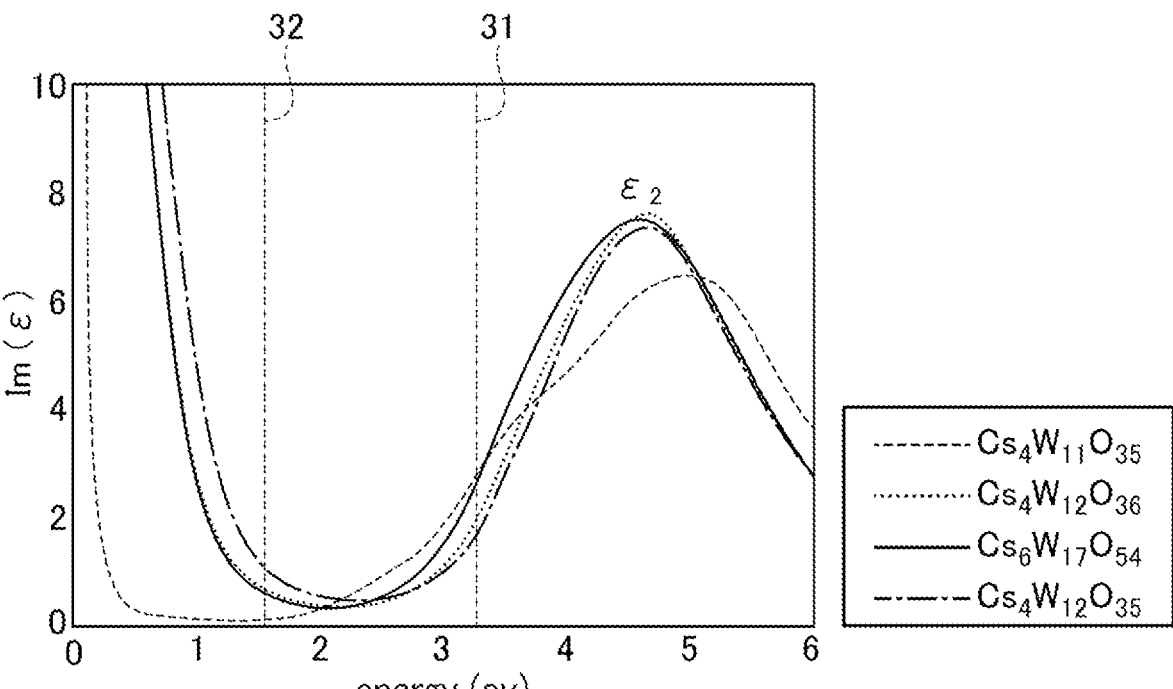
FIG. 3A is a drawing illustrating dielectric functions of cesium tungsten oxide.
Figure 3B:
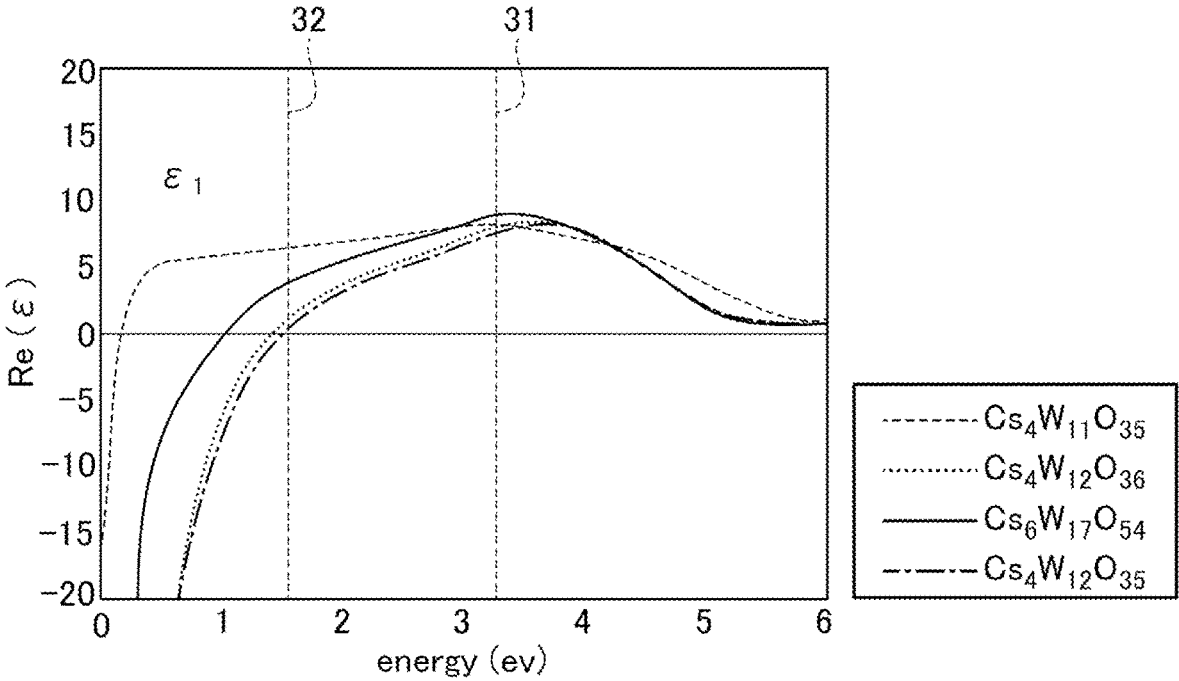
FIG. 3B is a drawing illustrating dielectric functions of the cesium tungsten oxide.

FIG. 3A and FIG. 3B illustrate the results of calculating of dielectric functions including the Drude term based on these band structures. At $\varepsilon_1 = 0$ of dielectric functions illustrated in FIG. 3B, the screened plasma frequency ($\Omega_{SP}$) is seen to increase in the order of $Cs_4W_{11}O_{35}$, $Cs_6W_{17}O_{54}$, $Cs_4W_{12}O_{36}$, and $Cs_4W_{12}O_{35}$. The near-infrared absorption is expected to increase in this order, and this trend is consistent with the observed results.

As can be seen from dielectric functions in FIG. 3A, for cesium tungsten oxide, ε2 is generally small in the visible region. At 3.3 eV in the blue region indicated by a dashed line 31, the inter-band transition dictates the optical absorption, and thus, the $Cs_4W_{11}O_{35}$ and $Cs_6W_{17}O_{54}$ absorption is enlarged by the narrow band gap. Conversely, at 1.6 eV in the red region indicated by a dashed line 32, the $Cs_4W_{12}O_{35}$ absorption is affected and enlarged by the tail of the localized surface plasmon resonance absorption. The transmission light in the red region is expected to decrease in the order of decreasing $\Omega_{SP}$. The $\varepsilon_2$ profiles in the visible light region illustrated in FIG. 3A basically correspond to experimentally observed profiles of FIG. 9B, and the trend is well reproduced. That is, as compared to traditionally-used cesium tungsten oxide, the reason why cesium tungsten oxide contained in electromagnetic wave absorbing particles, which can be preferably used in an electromagnetic wave absorbing particle dispersion, has a less-bluish tint is considered to be because $nCs_2O.mWO_3$ ($3.6 \leq m/n \leq 9.0$) including W and O defects is used as the raw material, and as a result, a $Cs_{0.33}W_{1-y}O_{3-z}$ phase including W defects is formed and the absorption at the high-energy side is increased. The band gap and the amount of electrons injected into the conduction band can be controlled by adjusting the high-temperature reduction of $nCs_2O.mWO_3$ ($3.6 \leq m/n \leq 9.0$), thus allowing a bluish color tone to be adjusted. In addition, it is confirmed that a near-infrared absorption effect at that time is maintained at a relatively high level.

(Method of Manufacturing Electromagnetic Wave Absorbing Particles)

A method of manufacturing electromagnetic wave absorbing particles according to the present embodiment is not particularly limited, and electromagnetic wave absorbing particles can be manufactured by any method that can satisfy the properties described herein. In the following, an example of a method of manufacturing electromagnetic wave absorbing particles will be described.

The method of manufacturing electromagnetic wave absorbing particles according to the present embodiment can include:

a cesium tungsten oxide precursor synthesizing process for synthesizing a cesium tungsten oxide precursor, which is cesium-containing tungstate; and a heating and reducing process for heating and reducing the cesium tungsten oxide precursor at a temperature in the range of 650° C. to 950° C. in a reducing gas atmosphere.

In the following, each of the processes will be described.

(1) Cesium Tungsten Oxide Precursor Synthesizing Process

In the cesium tungsten oxide precursor synthesizing process, a cesium tungsten oxide precursor, which is cesium-containing tungstate, i.e., cesium tungstate, can be synthesized. If the cesium tungsten oxide precursor has already been synthesized, the method for manufacturing electromagnetic wave absorbing particles can be started from the heating and reducing process.

Note that the cesium tungsten oxide precursor, which is cesium tungstate, is preferably a crystalline powder of $nCs_2O.mWO_3$ (n and m are integers, and $3.6 \leq m/n \leq 9.0$). As the cesium tungsten oxide precursor, which is cesium tungstate, stable cesium tungstate is preferable. As the stable cesium tungstate, one or more kinds selected from $Cs_4W_{11}O_{35}$, $Cs_2W_6O_{19}$, $Cs_6W_{20}O_{63}$, $Cs_2W_7O_{22}$, $Cs_6W_{11}O_{36}$, and the like can be used. The cesium tungsten oxide precursor is more preferably a cesium tungsten oxide precursor that includes the $Cs_4W_{11}O_{35}$ phase as the main phase.

The cesium tungstate can be prepared by, for example, firing a raw material powder mixture containing cesium and tungstate at a temperature in the range of 700° C. to 1000° C. in air. Note that the method for manufacturing the cesium tungstate is not limited to the above-described method, and any other method such as a sol-gel method or a complex polymerization method can be used.

Further, as the cesium tungstate used as a starting material, non-equilibrium tungstate obtained by vapor phase synthesis or the like may be used. For example, a powder obtained by a thermal plasma method, a powder obtained by electron beam melting, or the like may be used.

(2) Heating and Reducing Process

The above-described cesium tungsten oxide precursor as the starting material, specifically, cesium tungstate having one or more crystal structures selected from an orthorhombic crystal structure, a monoclinic crystal structure, and a pseudo-hexagonal crystal structure can be subjected to the heating and reducing process.

In the heating and reducing process, the above-described cesium tungsten oxide precursor can be heated and reduced at a temperature in the range of 650° C. to 950° C. By performing the heating and reducing process, electromagnetic wave absorbing particles including cesium tungsten oxide of a desired composition can be obtained.

The heating and reducing process is preferably performed in a reducing gas atmosphere. As the reducing gas, a mixed gas including a reducing gas, such as hydrogen, and one or more inert gases selected from helium, argon, and the like can be used. Further, heating in a water vapor atmosphere, heating under vacuum, and other mild heating and reducing conditions may be combined.

The method for manufacturing electromagnetic wave absorbing particles according to the present embodiment is not limited to the above-described method. As the method for manufacturing electromagnetic wave absorbing particles, various methods can be used as long as a predetermined structure including a defect microstructure can be obtained. Examples of the method for manufacturing electromagnetic wave absorbing particles include a method for reducing tungstate obtained by a solid phase method, a liquid phase method, or a gas phase method, and a method for reducing $WO_3$ in a molten alkali halide.

The method for manufacturing electromagnetic wave absorbing particles may further include any processes.

(3) Pulverization Process

As described, electromagnetic wave absorbing particles are preferably pulverized into fine particles. For this reason, the method for manufacturing electromagnetic wave absorbing particles can include a pulverization process for pulverizing a powder obtained by the heating and reducing process.

A specific method for pulverizing electromagnetic wave absorbing particles into fine particles is not particularly limited, and various mechanical pulverization methods can be used. Examples of the mechanical pulverization methods include a dry pulverization method using a jet mill, and the like. Further, in a process of obtaining an electromagnetic wave absorbing particle dispersion liquid, which will be described later, mechanical pulverization may be carried out in a solvent. In this case, in the pulverization process, electromagnetic wave absorbing particles are dispersed in a liquid medium. Thus, the pulverization process can also be referred to as a pulverization/dispersion process.

(4) Modification Process

As described, the surfaces of electromagnetic wave absorbing particles may be modified with a compound containing one or more elements selected from Si, Ti, Zr, and Al. For this reason, the method for manufacturing electromagnetic wave absorbing particles may further include a modification process for modifying the surfaces of electromagnetic wave absorbing particles with a compound containing one or more elements selected from Si, Ti, Zr, and Al.

In the modification process, specific conditions for modifying electromagnetic wave absorbing particles are not particularly limited. For example, in the modification process, an alkoxide or the like containing one or more elements selected from the above-described group of elements (metals) may be added to electromagnetic wave absorbing particles to be modified, such that coating is formed on the surfaces of the electromagnetic wave absorbing particles.

[Electromagnetic Wave Absorbing Particle Dispersion Liquid]

Next, an example configuration of an electromagnetic wave absorbing particle dispersion liquid according to the present embodiment will be described.

The electromagnetic wave absorbing particle dispersion liquid according to the present embodiment can include the above-described electromagnetic wave absorbing particles, and a liquid medium that is one or more kinds selected from water, an organic solvent, oil, a liquid resin, and a liquid plastic plasticizer. The electromagnetic wave absorbing particle dispersion liquid has a configuration in which the electromagnetic wave absorbing particles are dispersed in the liquid medium.

As described above, as the liquid medium, one or more kinds selected from water, an organic solvent, oil, a liquid resin, and a liquid plastic plasticizer can be used.

The organic solvent may be selected from various solvents such as an alcohol-based solvent, a ketone-based solvent, a hydrocarbon-based solvent, and a glycol-based solvent, and a water-based solvent. Specifically, the organic solvent may be selected from one or more of alcohol-based solvents such as isopropyl alcohol, methanol, ethanol, 1-propanol, isopropanol, butanol, pentanol, benzyl alcohol, diacetone alcohol, and 1-methoxy-2-propanol; ketone-based solvents such as dimethyl ketone, acetone, methyl ethyl ketone, methyl propyl ketone, methyl isobutyl ketone, cyclohexanone, and isophorone; ester-based solvents such as 3-methyl-methoxy-propionate and butyl acetate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, and propylene glycol ethyl ether acetate; amides such as formamide, N-methylformamide, dimethylformamide, dimethylacetamide, and N-methyl-2-pyrrolidone; aromatic hydrocarbons such as toluene and xylene; and halogenated hydrocarbons such as ethylene chloride and chlorobenzene.

Among these, an organic solvent having a low polarity is preferable, and in particular, isopropyl alcohol, ethanol, 1-methoxy-2-propanol, dimethyl ketone, methyl ethyl ketone, methyl isobutyl ketone, toluene, propylene glycol monomethyl ether acetate, n-butyl acetate, and the like are more preferable. One or more of these organic solvents may be used singly or in combination.

The fat and oil may be selected from one or more of drying oils such as linseed oil, sunflower oil, and tung oil; semi-drying oils such as sesame oil, cottonseed oil, rapeseed oil, soybean oil, and rice bran oil; non-drying oils such as olive oil, coconut oil, palm oil, and dehydrated castor oil; fatty acid monoesters obtained by direct esterification of fatty acids of vegetable oil and monoalcohols; ethers; and petroleum solvents such as Isopar (registered trademark) E, Exxsol (registered trademark) Hexane, Heptane, E, D30, D40, D60, D80, D95, D110, and D130 (all manufactured by ExxonMobil).

The liquid resin may be selected from, for example, one or more of a liquid acrylic resin, a liquid epoxy resin, a liquid polyester resin, and a liquid urethane resin.

As the liquid plasticizer, for example, a liquid plasticizer for plastic or the like may be used.

Components contained in the electromagnetic wave absorbing particle dispersion liquid are not limited to the above-described electromagnetic wave absorbing particles and the liquid medium. Any components can be further added to and contained in the electromagnetic wave absorbing particle dispersion liquid as necessary.

For example, acid or alkali may be added to the electromagnetic wave absorbing particle dispersion liquid as necessary in order to adjust the pH of the dispersion liquid.

Further, as dispersants, various surfactants, coupling agents, and the like may be added to the above-described electromagnetic wave absorbing particle dispersion liquid in order to further improve dispersion stability of the electromagnetic wave absorbing particles and to prevent the dispersion particle size from becoming bulky due to reaggregation.

The dispersants such as the surfactants and the coupling agents can be selected according to the application; however, the dispersants preferably have, as functional groups, one or more groups selected from a group containing an amine, a hydroxyl group, a carboxyl group, and an epoxy group. These functional groups are adsorbed to the surfaces of the electromagnetic wave absorbing particles, prevent aggregation of the electromagnetic wave absorbing particles, and have the effect of uniformly dispersing the electromagnetic wave absorbing particles in a near-infrared shielding film formed by using the electromagnetic wave absorbing particles. A polymeric-based dispersant having one or more of the above-described functional groups in molecules is more preferable.

As commercial dispersants, one or more dispersants selected from Solsperse (registered trademark) 9000, 12000, 17000, 20000, 21000, 24000, 26000, 27000, 28000, 32000, 35100, 54000, and 250 (manufactured by Japan Lubrizol Co., Ltd.); Efka (registered trademark) 4008, 4009, 4010, 4015, 4046, 4047, 4060, 4080, 7462, 4020, 4050, 4055, 4400, 4401, 4402, 4403, 4300, 4320, 4330, 4340, 6220, 6225, 6700, 6780, 6782, and 8503 (manufactured by Efka additives); Ajisper (registered trademark) PA111, PB821, PB822, PN411, and Faymex L-12 (manufactured by Ajinomoto Fine-Techno Co., Inc.); DisperBYK (registered trademark) 101, 102, 106, 108, 111, 116, 130, 140, 142, 145, 161, 162, 163, 164, 166, 167, 168, 170, 171, 174, 180, 182, 192, 193, 2000, 2001, 2020, 2025, 2050, 2070, 2155, 2164, 220S, 300, 306, 320, 322, 325, 330, 340, 350, 377, 378, 380N, 410, 425, and 430 (manufactured by BYK Japan KK); Disparlon (registered trademark) 1751N, 1831, 1850, 1860, 1934, DA-400N, DA-703-50, DA-725, DA-705, DA-7301, DN-900, NS-5210, and NVI-8514L (manufactured by Kusumoto Chemicals, Ltd.); Arufon (registered trademark) UC-3000, UF-5022, UG-4010, UG-4035, and UG-4070 (manufactured by Toagosei Co., Ltd.); and the like may be preferably used.

A method for dispersing the electromagnetic wave absorbing particles in the liquid medium is not particularly limited, as long as the electromagnetic wave absorbing particles can be dispersed in the liquid medium. At this time, the electromagnetic wave absorbing particles are dispersed such that the average particle diameter of the electromagnetic wave absorbing particles is preferably 200 nm or less, and more preferably 0.1 nm or more and 200 nm or less.

Examples of the method for dispersing the electromagnetic wave absorbing particles in the liquid medium include dispersion methods using devices such as a bead mill, a ball mill, a sand mill, a paint shaker, and an ultrasonic homogenizer. Among these, it is preferable to pulverize and disperse the electromagnetic wave absorbing particles by using a media agitation mill such as a bead mill, a ball mill, a sand mill, and a paint shaker that use media (beads, balls, or Ottawa sand), from the viewpoint of reducing the time required to obtain the desired average particle diameter. Pulverizing and dispersing the electromagnetic wave absorbing particles by using the media agitation mill allow the electromagnetic wave absorbing particles to be dispersed in the liquid medium, and at the same time, to be made finer by collisions between the electromagnetic wave absorbing particles and collisions between the medium and the electromagnetic wave absorbing particles. That is, the electromagnetic wave absorbing particles can be made finer and can be dispersed. In other words, the electromagnetic wave absorbing particles are subjected to the pulverization/dispersion process.

The average particle diameter of the electromagnetic wave absorbing particles is preferably 0.1 nm or more and 200 nm or less as described above. This is because, if the average particle diameter is small, the scattering of in the visible light region of 400 nm to 780 nm caused by geometric scattering or Mie scattering can be reduced. As a result, it is possible to avoid a situation in which an electromagnetic wave absorbing particle dispersion becomes like frosted glass and the clear transparency is not obtained. The electromagnetic wave absorbing particle dispersion in which the electromagnetic wave absorbing particles are dispersed in a resin or the like is obtained by using the electromagnetic wave absorbing particle dispersion liquid according to the present embodiment. That is, if the average particle diameter becomes 200 nm or less, geometric scattering or Mie scattering described above is reduced, and a Rayleigh scattering region is formed. In the Rayleigh scattering region, the scattered light decreases in inverse proportion to the sixth power of the dispersed particle diameter, so that the scattering decreases as the dispersed particle diameter decreases, and the transparency can be improved. If the average particle diameter is 100 nm or less, the scattered light can be significantly reduced, which is more preferable.

With respect to the state of the electromagnetic wave absorbing particle dispersion in which electromagnetic wave absorbing particles are dispersed in a solid medium such as a resin, which is obtained by using the electromagnetic wave absorbing particle dispersion liquid according to the present embodiment, the particles are not aggregated more than the average particle diameter of the electromagnetic wave absorbing particles in the dispersion liquid as long as the dispersion liquid is added to the solid medium by a known method.

Further, when the average particle diameter of the electromagnetic wave absorbing particles is 0.1 nm or more and 200 nm or less, the electromagnetic wave absorbing particle dispersion and its molded products (plates, sheets, and the like) manufactured by using the electromagnetic wave absorbing particle dispersion liquid can be prevented from becoming grayish with monotonously decreased transmittance.

The content of the electromagnetic wave absorbing particles in the electromagnetic wave absorbing particle dispersion liquid according to the present embodiment is not particularly limited; however, the content of the electromagnetic wave absorbing particles may be preferably 0.01 mass % or more and 80 mass % or less. This is because sufficient solar transmittance can be achieved by setting the content of the electromagnetic wave absorbing particles to be 0.01 mass % or more. Further, by setting the content of the electromagnetic wave absorbing particles to be 80 mass % or less, the electromagnetic wave absorbing particles can be uniformly dispersed in a dispersion medium.

EXAMPLES

Hereinafter, the present invention will be described in more detail with reference to Examples. However, the present invention is not limited to the following Examples.

First, evaluation methods in the following Examples and Comparative Examples will be described.
(Chemical Analysis)

Chemical analysis of obtained electromagnetic wave absorbing particles was carried out by atomic absorption spectroscopy (AAS) for Cs and by ICP optical emission spectrometry (ICP-OES) for W (tungsten). In addition, for O, a light element analyzer (model: ON-836, manufactured by LECO) was used to melt a sample in He gas, and CO gas reacted with carbon in a crucible was obtained. Then, the CO gas was analyzed quantitatively by IR absorption spectroscopy. The composition ratio, when W (tungsten) was taken as 1, was calculated based on the content ratio of the elements obtained by the chemical analysis, and indicated in Table 1. In each of Examples 1 through 13, a powder that is electromagnetic wave absorbing particles including W-deficient cesium tungsten composite oxide was obtained. The composition ratio of each of powders A to M, which are electromagnetic wave absorbing particles obtained in Examples 1 through 13, was obtained by multiplying the composition ratio when W was taken as 1, as indicated in Table 1, by a value corresponding to W defect(s), and it was confirmed that the composition ratio satisfies the general formula $Cs_xW_{1-y}O_{3-z}$ ($0.2 \leq x \leq 0.4$, $0 < y \leq 0.4$, and $0 < z \leq 0.46$).

(X-Ray Diffraction Measurement)

X-ray diffraction measurement was carried out by powder XRD measurement using Cu—K-α rays with a device called X'Pert-PRO/MPD manufactured by Spectris Co., Ltd.

The measurement was carried out after the diffraction angle was calibrated with a standard sample (NIST640e). Then, the Rietveld analysis was performed based on the obtained XRD diffraction pattern, and the lattice constants of a crystal phase were obtained. In Table 1, "R" denotes a case in which an orthorhombic phase is included, "H" denotes a case in which a hexagonal phase is included, and "R+H" denotes a case in which an orthorhombic phase and a hexagonal phase are included.

In the case of a mixed-phase of an orthorhombic phase and a hexagonal phase, the lattice constants of each of the phases were obtained. Then, orthorhombic lattice constants were converted into hexagonal lattice constants by the following appropriate lattice-compatible model. Specifically, the formula $4a_{orth}^2 + b_{orth}^2 = 64a_{hex}^2 = 64b_{hex}^2$, $c_{orth} = c_{hex}$ extracted from the model of Solodovnikov 1998 (Non-Patent Document 4) was used for conversion from the orthorhombic lattice constants to the hexagonal lattice constants. In the above formula, $a_{orth}$, $b_{orth}$, and $c_{orth}$ mean the lengths of the a-axis, the b-axis, and the c-axis of an orthorhombic crystal. Further, $a_{hex}$, $b_{hex}$, and $c_{hex}$ mean the lengths of the a-axis, the b-axis, and the c-axis of a hexagonal crystal.

(Optical Properties of Electromagnetic Wave Absorbing Particle Dispersion Liquid)

The visible light transmittance (VLT) and the solar transmittance (ST) of an electromagnetic wave absorbing particle dispersion liquid were measured according to ISO 9050 and JIS R 3106. Specifically, the transmittance was measured by using a U-4100 spectrophotometer manufactured by Hitachi High-Tech Corporation, and calculated by multiplying by a coefficient corresponding to the spectrum of solar light. The transmittance was measured at 5 nm intervals in a range of wavelengths greater than or equal to 300 nm and less than or equal to 2100 nm. Tristimulus values X, Y, and Z are calculated for a standard illuminant D65 at an angle of 10° according to JIS Z 8701, and the L*a*b* color indices are obtained from the tristimulus values according to JIS Z 8729. Similarly, the RGB color indices are obtained from the tristimulus values.

Example 1

Cesium carbonate ($Cs_2CO_3$) and tungsten trioxide ($WO_3$) are weighed, mixed, and kneaded to obtain a molar ratio of $Cs_2CO_3$:$WO_3$=2:11. Then, the obtained kneaded product was placed in a carbon boat, and heated twice in a tubular furnace in air at 850° C. for 20 hours to obtain a powder A', which is a very slightly greenish white powder. Note that, after the kneaded product was heated at 850° C. for 20 hours, the kneaded product was taken out once. Then, the kneaded product was pulverized and mixed, and heated under the same conditions again.

The obtained white powder A' was evaluated as follows.

Although an X-ray diffraction pattern indicated that $Cs_6W_{11}O_{36}$ was slightly mixed, the powder was substantially identified as a $Cs_4W_{11}O_{35}$ single phase (ICDD 00-51-1891).

The lattice constants were measured as a=14.6733 Å, b=52.3841 Å, and c=7.7424 Å. The values were significantly close to a=14.6686 Å, b=52.3971 Å, and c=7.7356 Å, which are the values of Solodovnikov (Non-Patent Document 4). The chemical analysis result of this white powder was $Cs_{0.36}WO_{3.18}$, which was nearly consistent with the weighted composition.

Figure 4:
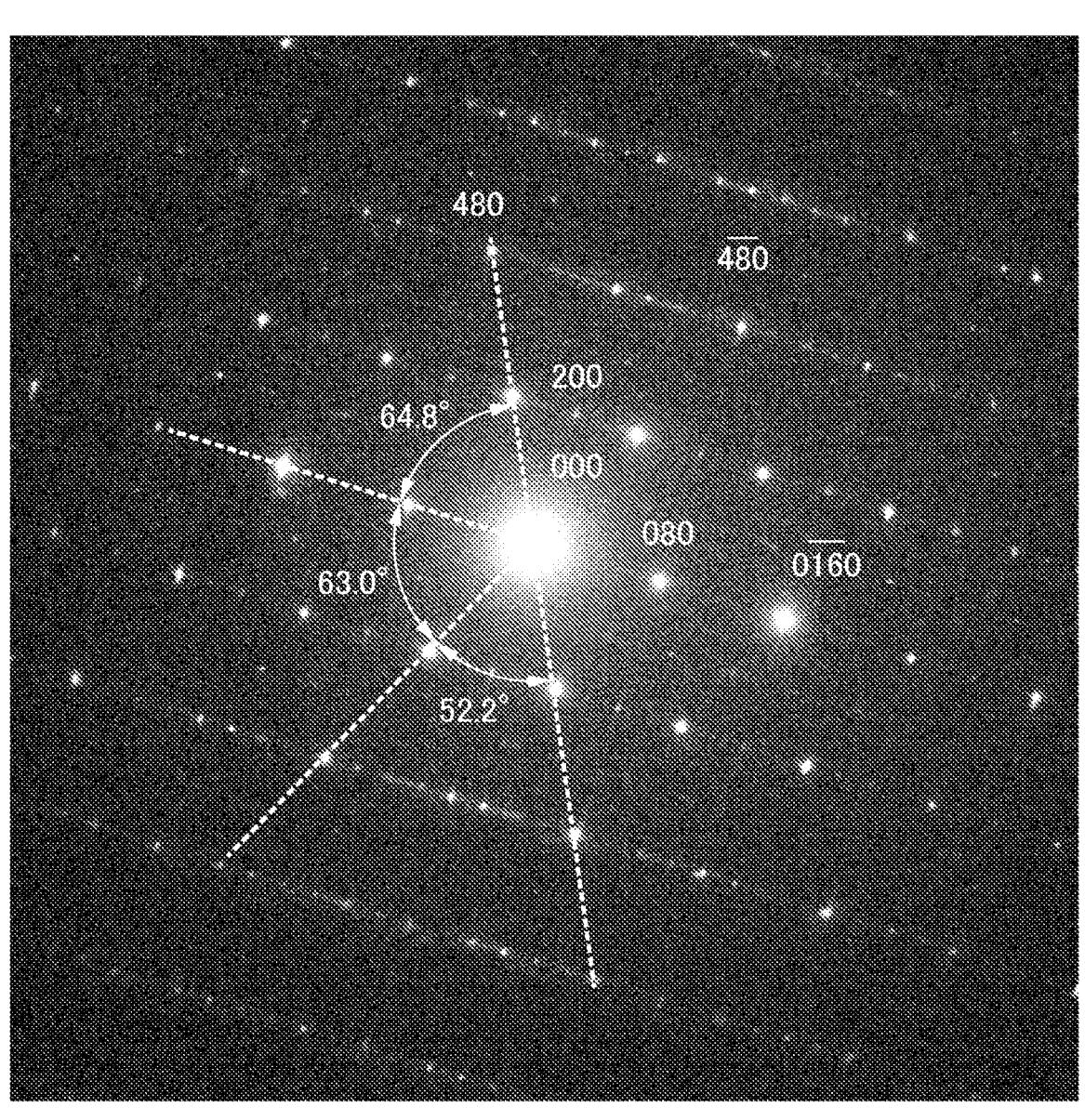
FIG. 4 is a drawing illustrating an electron diffraction image taken in the c-axis direction of a powder A' obtained in Example 1.

Next, TEM observation of the obtained white powder A' was performed. A selected area electron diffraction pattern indicated a spot pattern of an orthorhombic crystal. FIG. 4 illustrates a spot pattern taken in the c-axis direction of an orthorhombic crystal. A period of b/8 in the b-axis direction was observed, and the presence of W- and O-deficient planes were confirmed. Further, from a streak running in the b-axis direction, some plane defects were found on the b-plane. The spot pattern in the c-axis (zone axis) exhibited nearly six-fold symmetry, but the (480) and (4-80) spot angles were 52.2° out of 60° in the case of six-fold symmetry. Therefore, it was considered that six-fold symmetry was not observed due to the W- and O-deficient planes with a period of b/8.

The $Cs_4W_{11}O_{35}$ powder, which was the obtained white powder, was spread flat and thinly over a carbon boat, placed in a tubular furnace, and heated from room temperature to 800° C. in an Ar gas stream. While the temperature was maintained at 800° C., the gas stream was switched to a stream of 1 vol % $H_2$ gas (vol % is hereinafter simply referred to as %) using Ar gas as a carrier. After the $Cs_4W_{11}O_{35}$ powder was reduced for 5 minutes, the $H_2$ gas was stopped. Then, only the Ar gas stream was used to gradually cool the $Cs_4W_{11}O_{35}$ powder to 100° C., and subsequently, the Ar gas stream was stopped and the $Cs_4W_{11}O_{35}$ powder was gradually cooled to room temperature to obtain a powder A. The color tone of the obtained powder A was light blue.

The XRD pattern of the powder A indicated a two-phase mixed pattern of an orthorhombic phase and a hexagonal phase. The lattice constants of each of the phases were obtained by the Rietveld method. The lattice constants of the orthorhombic phase were a=14.6609 Å, b=52.4040 Å, and c=7.7419 Å (a=7.5062 Å and c=7.7419 Å when expressed in hexagonal terms). The lattice constants of the hexagonal phase were a=7.4170 Å and c=7.5752 Å. It was confirmed that the values of the c-axis were within the range of 7.560 Å≤c≤7.750 Å.

Next, TEM observation of powder A was performed. As a result, orthorhombic particles and pseudo-hexagonal particles were observed.

Figure 5:
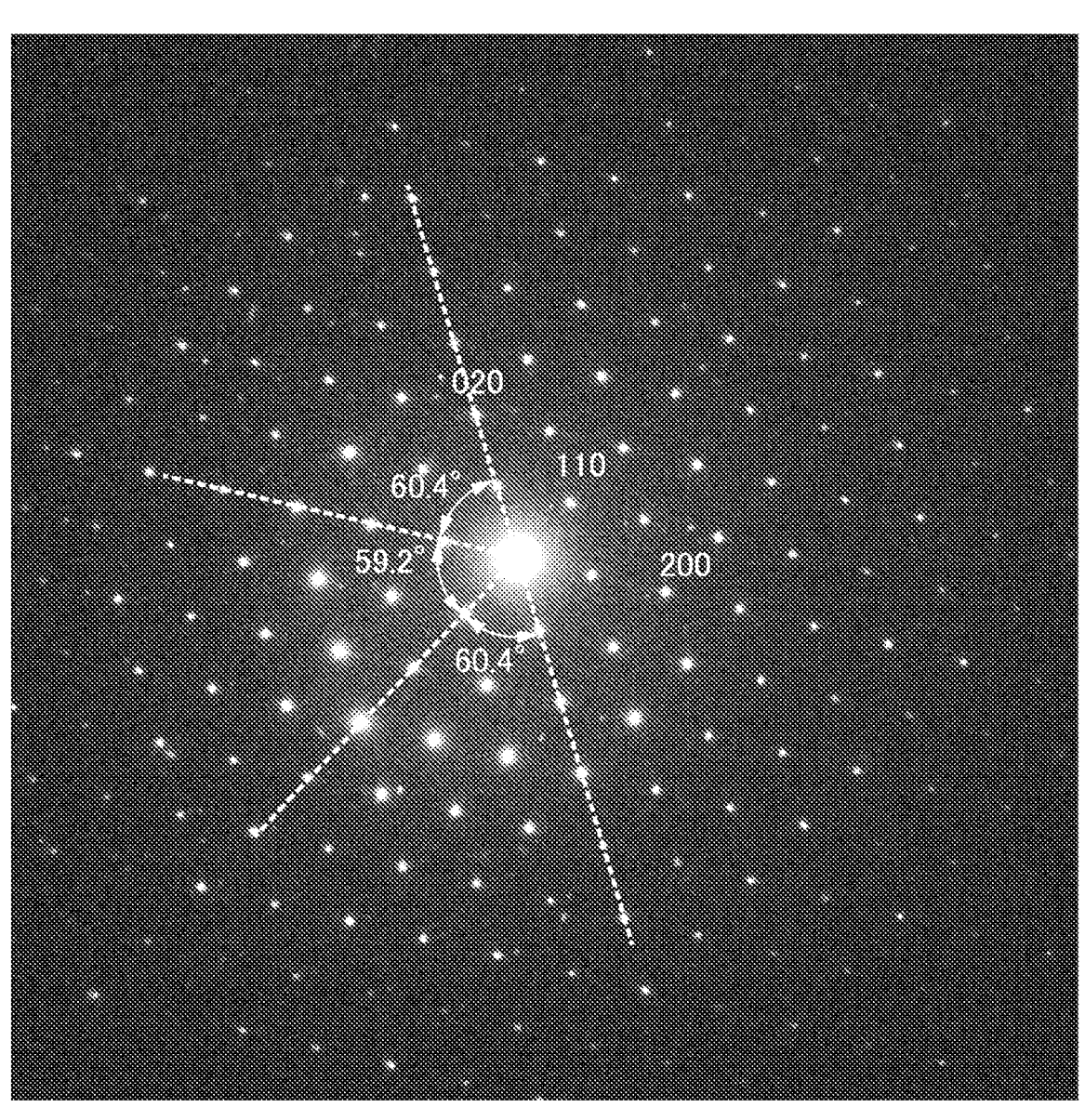
FIG. 5 is a drawing illustrating an electron diffraction image along the $[001]_{HEX}$ zone axis of pseudo-hexagonal particles of a powder A obtained in Example 1.

FIG. 5 illustrates an electron diffraction image of pseudo-hexagonal particles. As indicated in the electron diffraction image of the pseudo-hexagonal particles along the $[001]_{HEX}$ zone axis of FIG. 5, a diffraction pattern close to that of a hexagonal crystal was indicated. The angle between the $(200)_{HEX}$ plane and the $(110)_{HEX}$ plane was measured to be 59.2°, which was close to that of a hexagonal crystal.

Next, the powder A was observed in scanning transmission electron microscopy-high angle annular dark field (STEM-HAADF) mode.

Figure 6:
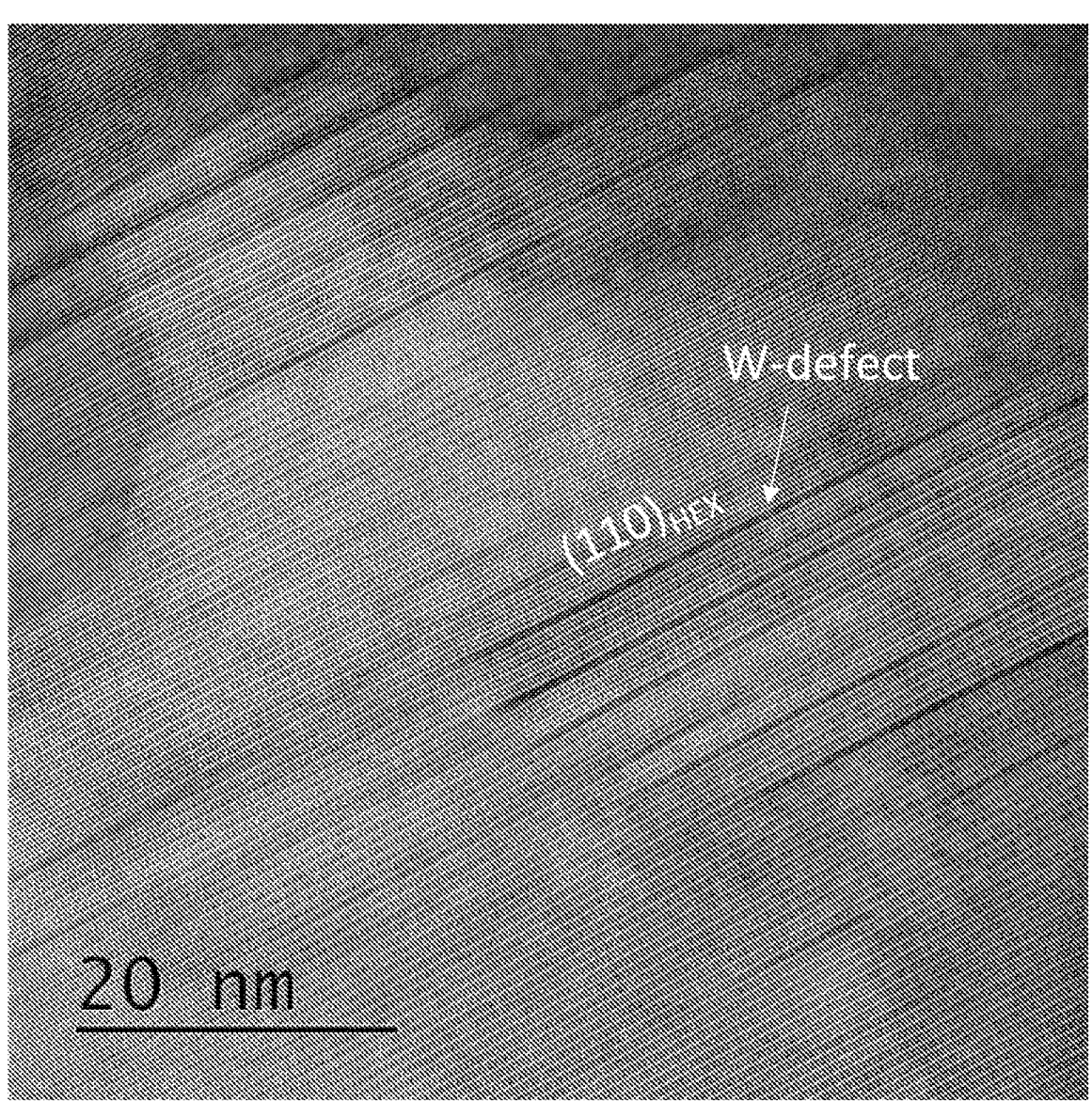
FIG. 6 is a drawing illustrating a STEM-HAADF image observed along the [221] zone axis of the pseudo-hexagonal particles of the powder A obtained in Example 1.

FIG. 6 illustrates an HAADF image observed along the [221] zone axis of the pseudo-hexagonal particles. In HAADF mode, atoms are observed with the intensity proportional to the atomic number and the probability of presence of atoms in the projection direction. Therefore, a dark-appearing linear region along the $(110)_{HEX}$ in FIG. 6 was identified as a defect region of W with the highest atomic number. It was confirmed that such a W defect region indicated by traces observed in a different direction extended in a planar fashion in the $(110)_{HEX}$. Further, it was considered that some of traces with light contrast indicated linearly shrunk regions.

In the present example, the heating and reducing process was performed for five minutes, which was shorter than the other examples described below. At the initial stage of high-temperature reduction, shrinkage of W defects in the orthorhombic $(010)_{ORTH}$ plane occurs, thereby causing the structure to transition to a pseudo-hexagonal crystal structure. In the quasi pseudo-hexagonal crystal structure, it was observed that many W-defect regions were being shrunk, thereby causing the structure to transition to the $\{100\}_{HEX}$ plane.

Example 2

The $Cs_4W_{11}O_{35}$ powder, which was the powder A' obtained in Example 1, was spread flat and thinly over a carbon boat, placed in a tubular furnace, and heated from room temperature to 800° C. in an Ar gas stream. While the temperature was maintained at 800° C., the gas stream was switched to a stream of 1% $H_2$ gas using Ar gas as a carrier. After the $Cs_4W_{11}O_{35}$ powder was reduced for 15 minutes, the $H_2$ gas was stopped. Then, only the Ar gas stream was used to gradually cool the $Cs_4W_{11}O_{35}$ powder to 100° C., and subsequently, the Ar gas stream was stopped and the $Cs_4W_{11}O_{35}$ powder was gradually cooled to room temperature to obtain a powder B. The color one of the powder B was blue.

The XRD pattern of the powder B indicated a two-phase mixed pattern of an orthorhombic phase and a hexagonal phase. The lattice constants of each of the phases were obtained by the Rietveld method. The lattice constants of the orthorhombic phase were a=14.6576 Å, b=52.4315 Å, and c=7.7412 Å (a=7.5088 Å and c=7.7412 Å when expressed in hexagonal terms). The lattice constants of the hexagonal phase were a=7.4122 Å and c=7.5940 Å. It was confirmed that the values of the c-axis were within the range of 7.560 Å≤c≤7.750 Å.

Figure 7:
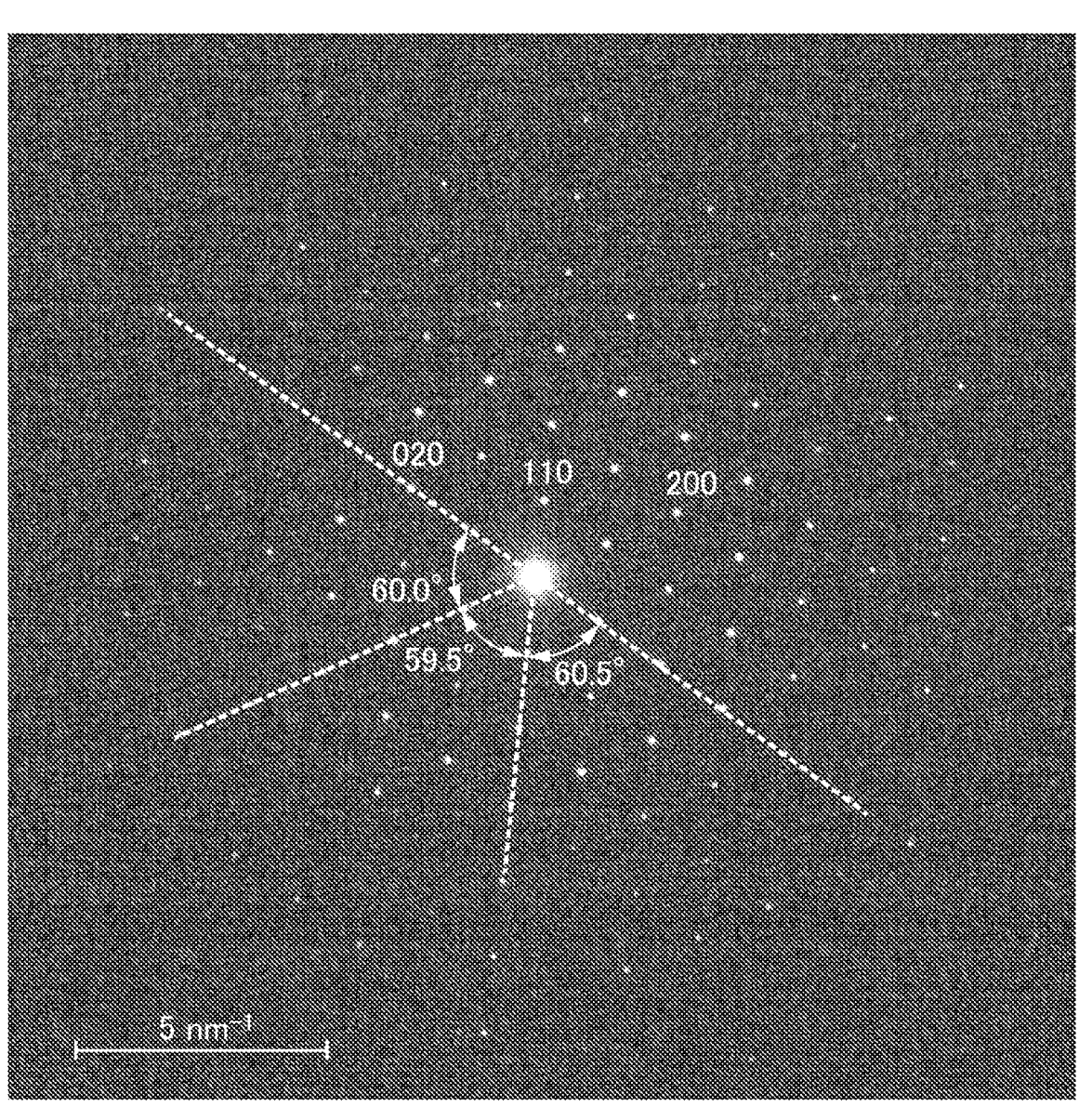
FIG. 7 is a drawing illustrating an electron diffraction image along the $[001]_{HEX}$ zone axis of pseudo-hexagonal particles of a powder B obtained in Example 2.

Next, TEM observation of the powder B was performed. Similar to the powder A obtained in Example 1, orthorhombic particles and pseudo-hexagonal particles were observed. As indicated in an electron diffraction image along the $[001]_{HEX}$ zone axis of the pseudo-hexagonal particles of FIG. 7, a diffraction pattern close to that of a hexagonal crystal was observed. The angle between the $(200)_{HEX}$ plane and the $(110)_{HEX}$ plane was measured to be 59.5°, which was close to that of a hexagonal crystal.

Example 3

The $Cs_4W_{11}O_{35}$ powder, which was the powder A' obtained in Example 1, was spread flat and thinly over a carbon boat, placed in a tubular furnace, and heated from room temperature to 800° C. in an Ar gas stream. While the temperature was maintained at 800° C., the gas stream was switched to a stream of 1% $H_2$ gas using Ar gas as a carrier. After the $Cs_4W_{11}O_{35}$ powder was reduced for 30 minutes, the $H_2$ gas was stopped. Then, only the Ar gas stream was used to gradually cool the $Cs_4W_{11}O_{35}$ powder to 100° C., and subsequently, the Ar gas stream was stopped and the $Cs_4W_{11}O_{35}$ powder was gradually cooled to room temperature to obtain a powder C. Me color tone of the powder C was dark blue.

The XRD pattern of the powder C indicated a two-phase mixed pattern of an orthorhombic phase and a hexagonal phase. The lattice constants of each of the phases were obtained by the Rietveld method. The lattice constants of the orthorhombic phase were a=14.6649 Å, b=52.4010 Å, and c=7.7451 Å (a=7.5064 Å and c=7.7451 Å when expressed in hexagonal terms). The lattice constants of the hexagonal phase were a=7.4076 Å and c=7.6107 Å. It was confirmed that the values of the c-axis were within the range of 7.560 Å≤c≤7.750 Å.

Figure 8:
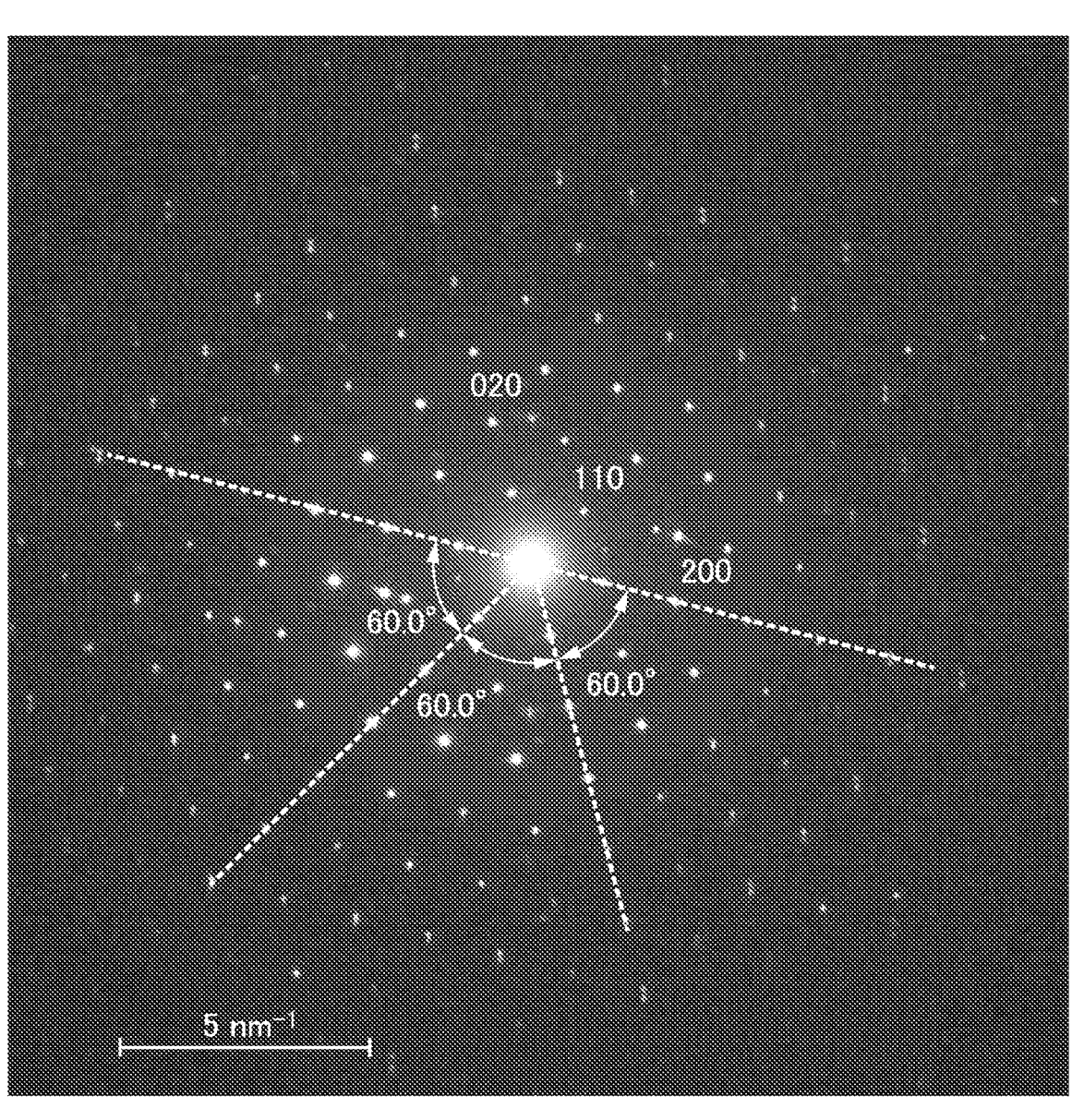
FIG. 8 is a drawing illustrating an electron diffraction image along the $[001]_{HEX}$ zone axis of pseudo-hexagonal particles of a powder C obtained in Example 3.

Next, TEM observation of the powder C was performed. Similar to the powder A obtained in Example 1, orthorhombic particles and pseudo-hexagonal particles were observed. As indicated in an electron diffraction image along the [001] zone axis of the pseudo-hexagonal particles of FIG. 8, a diffraction pattern of a hexagonal crystal was observed. The angle between the $(200)_{HEX}$ plane and the $(110)_{HEX}$ plane was measured to be 60.0°, which was equal to that of the hexagonal crystal.

Example 4 Through Example 7

The reduction time of the $Cs_4W_{11}O_{35}$ powder, which was the powder A' obtained in Example 1, was changed in the range of 35 minutes to 90 minutes as indicated in Table 1. Except for the above-described reduction time, a powder D, a powder E, a powder F, and a powder G were produced in the same manner as that of the powder A of Example 1. The color tones of the powder D, the powder E, the powder F, and the powder G were all dark blue. The lattice constants obtained from XRD patterns are as indicated in Table 1.

As indicated in Table 1, in Example 4, an orthorhombic phase was also observed. The c-axis length was 7.7440 Å when expressed in hexagonal terms (Example 4).

Example 8 Through Example 11

The heating temperature and reduction time of the $Cs_4W_{11}O_{35}$ powder, which was the powder A' obtained in Example 1, in the heating and reducing process were changed as indicated in Table 1. Specifically, the $Cs_4W_{11}O_{35}$ powder was heated and reduced at 650° C. for 120 minutes in Example 8, at 700° C. for 60 minutes in Example 9, at 900° C. for 10 minutes in Example 10, and at 950° C. for 20 minutes in Example 11. Except for the above-described heating temperature and reduction time, a powder H, a powder I, a powder J, and a powder K were produced in the same manner as that of the powder A of Example 1. The color tones of the powder H, the powder I, the powder J, and the powder K were light blue, blue, dark blue, and dark blue, respectively. The lattice constants obtained from XRD patterns of the powders are as indicated in Table 1.

As indicated in Table 1, in Examples 8 and 9 as well as Examples 12 and 13 as will be described below, orthorhombic phases were also observed. The c-axis lengths were 7.7428 Å (Example 8), 7.7471 Å (Example 9), 7.7449 Å (Example 12), and 7.7466 Å (Example 13) when expressed in hexagonal terms.

Example 12

Cesium carbonate and tungsten trioxide were mixed to obtain a molar ratio of $Cs_2CO_3:WO_3=3:11$, spread flat and thinly over a carbon boat, placed in a tubular furnace, and heated at 850° C. for 5 hours to obtain a very slightly greenish white powder. The main phase of the white powder was $Cs_6W_{11}O_{36}$ (ICDD1-70-632), but it was a mixed phase with $Cs_4W_{11}O_{35}$.

The obtained white powder was heat-treated at 800° C. for 30 minutes in a 1% $H_2$—$N_2$ gas stream to obtain a dark blue powder L.

The XRD pattern of the powder L indicated a two-phase mixed pattern of an orthorhombic phase and a hexagonal phase. The lattice constants obtained from the XRD pattern of the powder L are as indicated in Table 1.

Example 13

Cesium carbonate and tungsten trioxide were mixed to obtain a molar ratio of $Cs_2CO_3:WO_3=1:6$, spread flat and thinly over a carbon boat, placed in a tubular furnace, and heated at 850° C. for 5 hours to obtain a very slightly greenish white powder. The main phase of the white powder was $Cs_4W_{11}O_{35}$, but it was a mixed phase with $Cs_2W_6O_{19}$ (ICDD00-045-0522).

The obtained white powder was heat-treated at 800° C. for 30 minutes in a 1% $H_2$—$N_2$ gas stream to obtain a dark blue powder M.

The XRD pattern of the powder M indicated a two-phase mixed pattern of an orthorhombic phase and a hexagonal phase. The lattice constants obtained from the XRD pattern of the powder M are as indicated in Table 1.

As described in Examples 1 through 13 above, when the white $Cs_4W_{11}O_{35}$ powder, or the $Cs_4W_{11}O_{35}$ powder including $Cs_6W_{11}O_{36}$ or $Cs_2W_6O_{19}$ was reduced at a high temperature, the powder color gradually changed from light blue to blue or dark blue.

Further, although the $Cs_4W_{11}O_{35}$ phase had lattice defects including W defects and was orthorhombic, it was confirmed that the lattice defects including W defects were eliminated after high-temperature reduction.

Example 14

20 mass % of the powder A produced in Example 1, 10 mass % of an acryl-based polymeric dispersant (hereinafter referred to as "dispersant a" having an amine-containing group as a functional group, and 70 mass % of methyl isobutyl ketone (MIBK) as a solvent were weighed. These weighted materials were placed into a glass container together with silica beads having a diameter of 0.3 mm, and dispersed and pulverized for 5 hours by using a paint shaker to obtain a dispersion liquid A.

The average particle diameter of electromagnetic wave absorbing particles in the dispersion liquid A (dispersed particle diameter measured by ELS-8000, which is a particle diameter measuring device manufactured by Otsuka Electronics Co., Ltd., based on a dynamic light scattering method) was measured to be 26.4 nm.

Figure 9A:
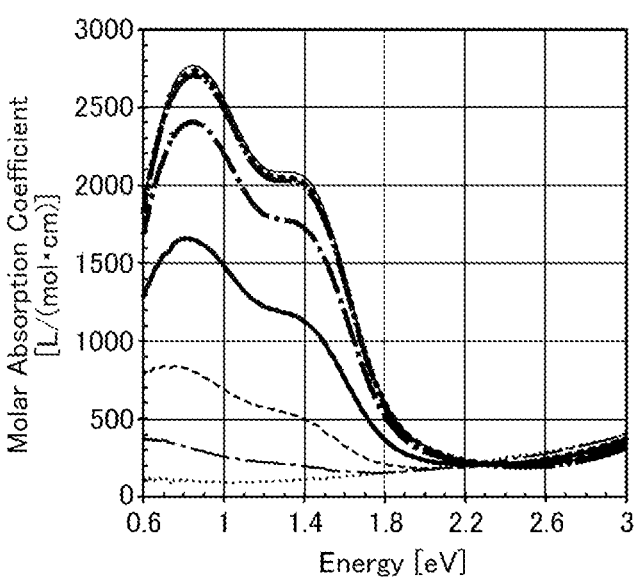
FIG. 9A is a drawing illustrating molar absorption coefficients of dispersion liquids produced in Examples 14 through 20 and Comparative Example 1.
Figure 9A:
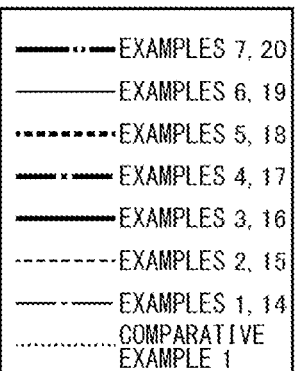
Figure 9B:
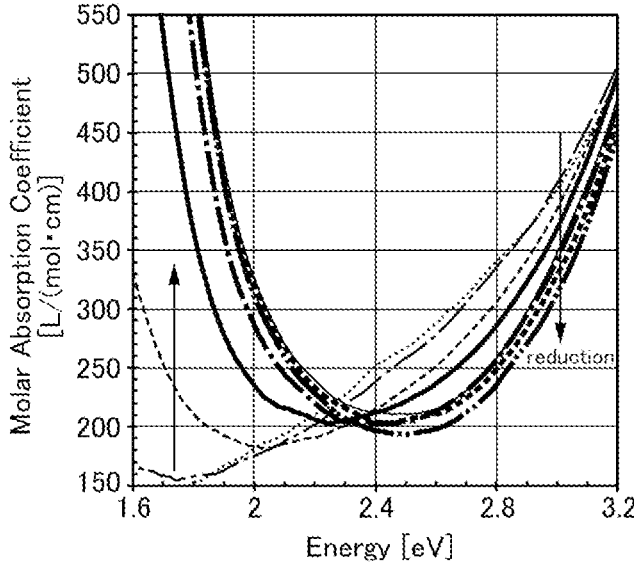
FIG. 9B is a drawing illustrating the molar absorption coefficients of the dispersion liquids produced in Examples 14 through 20 and Comparative Example 1.
Figure 9B:
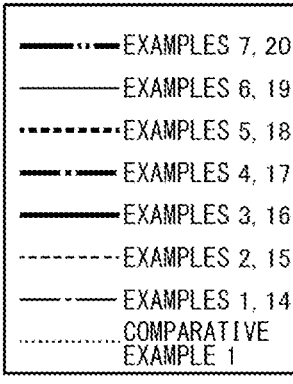
Figure 9C:
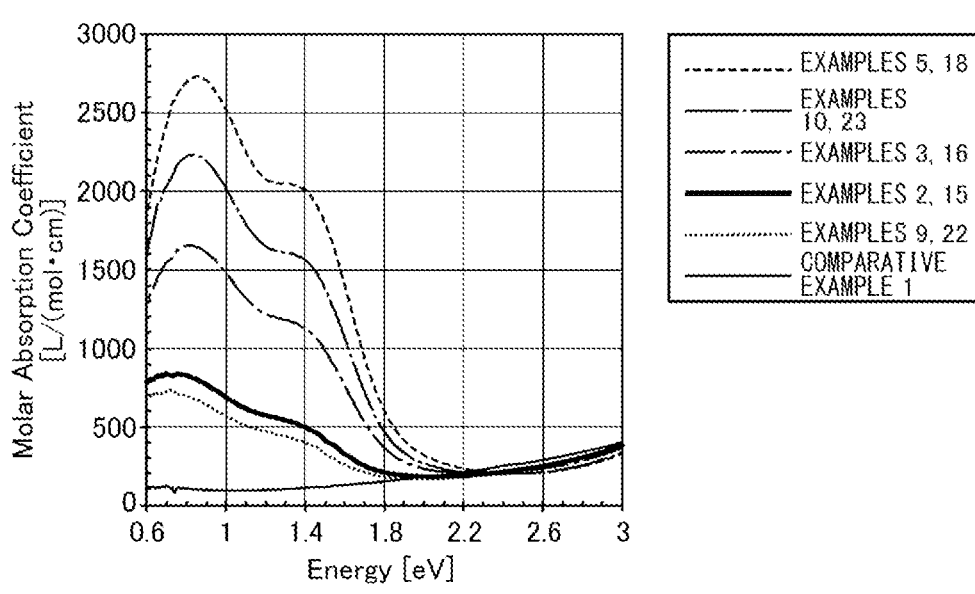
FIG. 9C is a drawing illustrating molar absorption coefficients of dispersion liquids produced in Examples 15, 16, 18, 22, and 23, and Comparative Example 1.

This dispersion liquid A was diluted with MIBK to a concentration of 0.05 wt %, and injected into a transparent cell having an optical path length of 10 mm. Then, its transmittance was measured by a U-4100 spectrophotometer manufactured by Hitachi High-Tech Corporation, and the molar absorption coefficient was obtained. The profiles are depicted in FIG. 9A and FIG. 9B. FIG. 9A illustrates molar absorption coefficients of electromagnetic wave absorbing particle dispersion liquids of Examples 14 through 20 and Comparative Example 1, produced by using the electromagnetic wave absorbing particles produced in Examples 1 through 7. FIG. 9B is a partially enlarged view of FIG. 9A. FIG. 9C illustrates molar absorption coefficients of electromagnetic wave absorbing particle dispersion liquids of Examples 15, 16, 18, 22, and 23 and Comparative Example 1, produced by using the electromagnetic wave absorbing particles produced in Examples 2, 3, 5, 9, and 10.

According to the profiles depicted in FIG. 9A and FIG. 9B, the absorption in the near-infrared region in the range of 0.6 eV to 1.6 eV was confirmed, and the transmittance in the visible region in the range of 1.6 eV to 3.0 eV was confirmed.

The visible light transmittance (VLT), the solar transmittance transmittance (ST), and the transmittance at near-infrared wavelength 900 nm (T900) were measured to be 72.32%, 53.28%, and 63.2%, respectively. Thus, visible light transparency and near-infrared absorption effects were confirmed. Color indices were L*=87.91, a*=−1.26, and b*=8.52, indicating that the color tone is less bluish and close to a neutral color. Similarly, RGB indices were R=224, G=220, and B=201, indicating that the color tone is close to neutral.

Example 15

The powder B produced in Example 2 was dispersed and pulverized in the same manner as Example 14 to obtain a dispersion liquid B. The dispersed particle diameter of particles in the dispersion liquid B was 31.4 nm.

The measured molar absorption coefficient of the dispersion liquid B is illustrated in FIG. 9A through FIG. 9C. As solar shielding effects and transmission colors change depending on VLT values, the solar shielding effects and the transmission colors need to be evaluated at a constant VLT. In Example 15, a transmittance profile was derived from the molar absorption coefficient using the Lambert-Beer equation, such that a VLT value similar to that of the spectral transmittance of the dispersion liquid A of Example 14 was obtained.

Figure 10A:
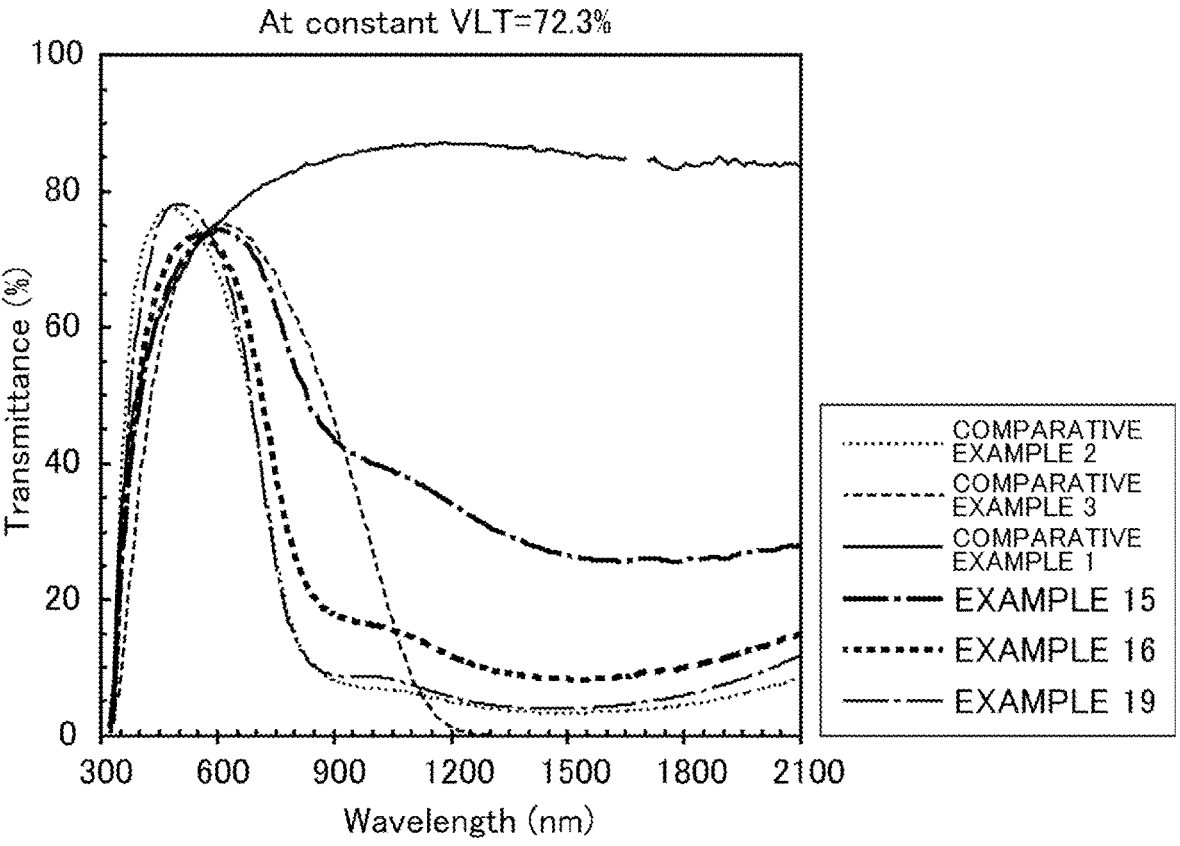
FIG. 10A is a drawing illustrating transmittance profiles of dispersion liquids produced in Example 15, Example 16, Example 19, and Comparative Example 1 through Comparative Example 3, in which the transmittance profiles are derived such that constant VLT is obtained.
Figure 10B:
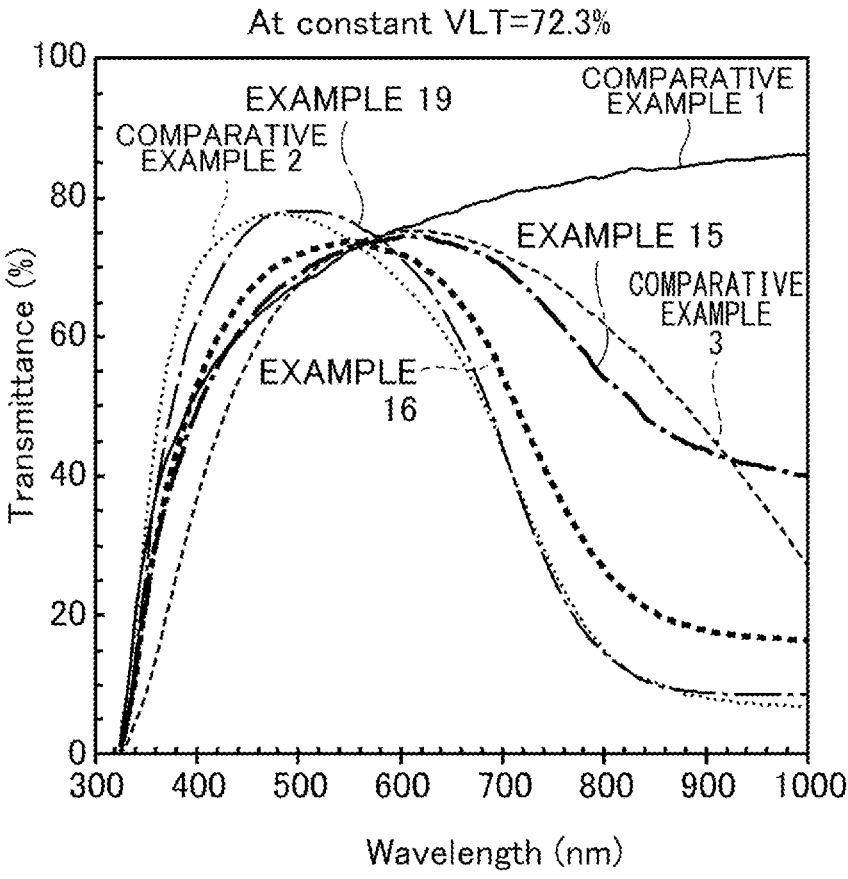
FIG. 10B is drawing illustrating the transmittance profiles of the dispersion liquids produced in Example 15, Example 16, Example 19, and Comparative Example 1 through Comparative Example 3, in which the transmittance profiles are derived such that constant VLT is obtained.

The optical properties of the dispersion liquid B obtained as described above were VLT=72.35%, ST=39.84%, and T900=43.7%. It was found that the dispersion liquid B has a significantly favorable solar shielding property. The transmittance profile is depicted in FIG. 10A and FIG. 10B. Further, color indices were L*=88.04, a*=−3.66, and b*=5.18. As b* is a positive value, the color tone is less blueish and close to neutral. Similarly, RGB indices were R=217, G=222, and B=208. This indicates that the color tone is close to a neutral color. It is expected that a dispersion film of the powder B with a VLT of 70 to 80%, which is used for automotive windshields, has almost no blue tint.

Comparative Example 1

The $Cs_4W_{11}O_{35}$ powder, which was the powder A' obtained in Example 1, was dispersed and pulverized in the same manner as Example 14 to obtain a dispersion liquid N. The color of the dispersion liquid N was greyish white, and the dispersed particle diameter of particles in the dispersion liquid N was 30.3 nm.

The measured molar absorption coefficient of the dispersion liquid N is illustrated in FIG. 9A through FIG. 9C. Similar to Example 15, the transmittance profile was derived from the molar absorption coefficient using the Lambert- Beer equation, such that a VLT value similar to that of the spectral transmittance of the dispersion liquid A of Example 14 was obtained.

The optical properties of the dispersion liquid N obtained as described above were VLT=72.32% and ST=77.89. It was found that almost no infrared absorption effect was observed.

Comparative Example 2

A raw material mixture was prepared by weighing, mixing, and kneading an aqueous solution of cesium carbonate ($Cs_2CO_3$), tungstic acid ($H_2WO_4$), and tungsten dioxide powder ($WO_2$) to obtain a composition of $Cs_2O.5WO_3.4WO_2$. After being sufficiently mixed, the raw material mixture was spread flat and thinly over a carbon boat, and held at 550° C. for 60 minutes in a 1% $H_2$ gas stream using $N_2$ gas as a carrier. Subsequently, the gas stream was switched to a 100% $N_2$ stream. After the raw material mixture was held for one hour in the 100% $N_2$ stream, the raw material mixture was held for one hour by increasing the temperature to 800° C., and was gradually cooled to room temperature to obtain a powder O. The color of the powder O was dark blue. As a result of chemical analysis, the composition $Cs_{0.33}W_{2.74}$ was obtained.

The XRD pattern of the powder O indicated a single hexagonal phase. The lattice constants obtained by the Rietveld analysis were a=7.4088 Å and c=7.6033 Å. The value of tree c-axis lattice constant was a favorable value.

Next, TEM observation was performed. As a result, no significant lattice defect was observed and pseudo-hexagonal particles were observed. In STEM atomic image observation, no significant lattice defect was observed and no W defect was found.

The powder O was dispersed and pulverized in the same manner as Example 14 to obtain a dispersion liquid O. The color of the dispersion liquid O was dark blue. The dispersed particle diameter of electromagnetic wave absorbing particles in the dispersion liquid O was 25.8 nm. The dispersion liquid O was diluted with MIBK, and injected into a transparent cell having an optical path length of 10 mm. Then, its transmittance was measured, and the molar absorption coefficient was obtained. Similar to Example 15, a transmittance profile was derived from the molar absorption coefficient using the Lambert-Beer equation such that a similar VLT value was obtained. The transmittance profile is depicted in FIG. 10A and FIG. 10B. Spectral properties obtained were VLT=72.33% and ST=35.48%, and color indices were L*=88.29, a*=−5.52, and b*=−2.89, and R=206, G=224, and B=217. It can be seen that, although the dispersion liquid O has a high near-infrared absorption effect, a blue coloration is clearly recognized as the b* value is a negative value and the B value is a large value.

Comparative Example 3

As a color tone reference sample, a dispersion of $In_2O_3$:Sn (hereinafter abbreviated as "ITO") with a natural color tone was prepared. Although ITO fine particles are known to have a neutral color tone, there are a variety of types, ranging from slightly blue to brown powders, depending on the reduction method or production method. In this example, an ITO powder (a powder P), which is close to a pure transparent color, manufactured by ENAM Optoelectronic Material Co., Ltd., was used.

The powder P was dispersed and pulverized in the same manner as Example 14 to obtain a dispersion liquid P. The color of the dispersion liquid P was very light blue. The dispersed particle diameter of electromagnetic wave absorbing particles in the dispersion liquid P was 35.4 nm.

The dispersion liquid P was diluted with MIBK, and and injected into a transparent cell having an optical path length of 10 mm. Then, its transmittance was measured, and the molar absorption coefficient was obtained. Similar to Example 15, a transmittance profile was derived from the molar absorption coefficient using the Lambert-Beer equation such that a similar VLT value was obtained. The derived transmittance profile is depicted in FIG. 10A and FIG. 10B.

Spectral properties obtained were VLT=72.33%, ST=45.94%, and T900=46.4%, and color indices were L*=87.78, a*=−2.04, and b*=13.68, and R=226, G=220, and B=191. It can be seen that, as the b* value is a large positive value and the B value is a large value, the dispersion liquid P, which uses the ITO powder, has less blue tint and is recognized as having a neutral color. However, it was confirmed that a near-infrared absorption effect is similar to that of the dispersion liquid B in Example 15, and thus, the dispersion liquid P is inferior to the dispersion liquid O in Comparative Example 2.

Example 16 Through Example 20

The powder C through the powder G produced in Example 3 through Example 7 were dispersed and pulverized in the same manner as Example 14 to obtain a dispersion liquid C through a dispersion liquid G. Each of the dispersion liquids C through G was diluted with MIBK, and injected into a transparent cell having an optical path length of 10 mm. Then, for each of the dispersion liquids C through G, the transmittance was measured and a molar absorption coefficient was obtained, and similar to Example 15, a transmittance profile was derived from the molar absorption coefficients using the Lambert-Beer equation. The dispersed particle diameter, optical properties, and color indices of each of the dispersion liquids are depicted in Table 2. The molar absorption coefficient profiles are depicted in FIG. 9. In each of the dispersion liquids, it can be seen that as the reduction time at 800° C. increases, the near-infrared absorption increases, and the transmission color tends to become blue. However, it was confirmed that the color tone of each of the dispersion liquids was close to a neutral color.

FIG. 10A and FIG. 10B summarize transmittance profiles of dispersion liquids in Comparative Example 1 through Comparative Example 3 and Example 15, Example 16, and Example 19. The transmittance profiles were derived from molar absorption coefficients using the Lambert-Beer equation such that VLT=72.3%. FIG. 10B is a partially enlarged view of FIG. 10A.

Figure 11A:
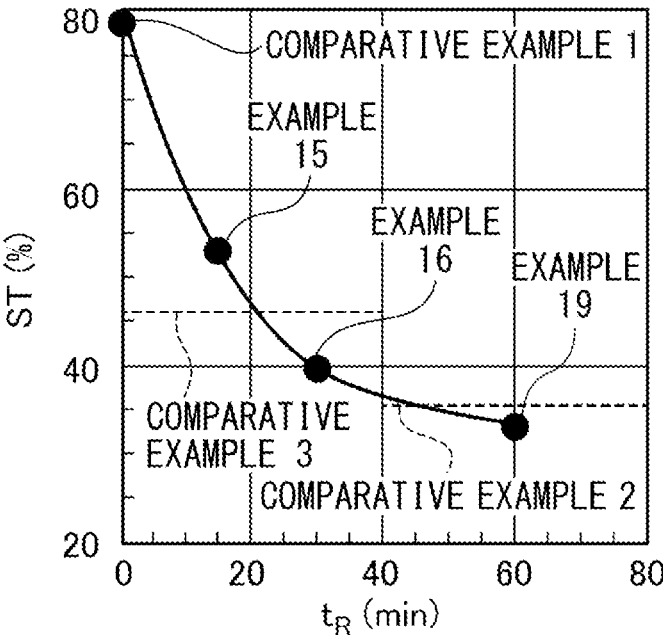
FIG. 11A is a drawing illustrating changes, with the reduction time, in near-infrared absorption properties of the dispersion liquids according to Comparative Example 1 through Comparative Example 3, Example 15, Example 16, and Example 19.
Figure 11B:
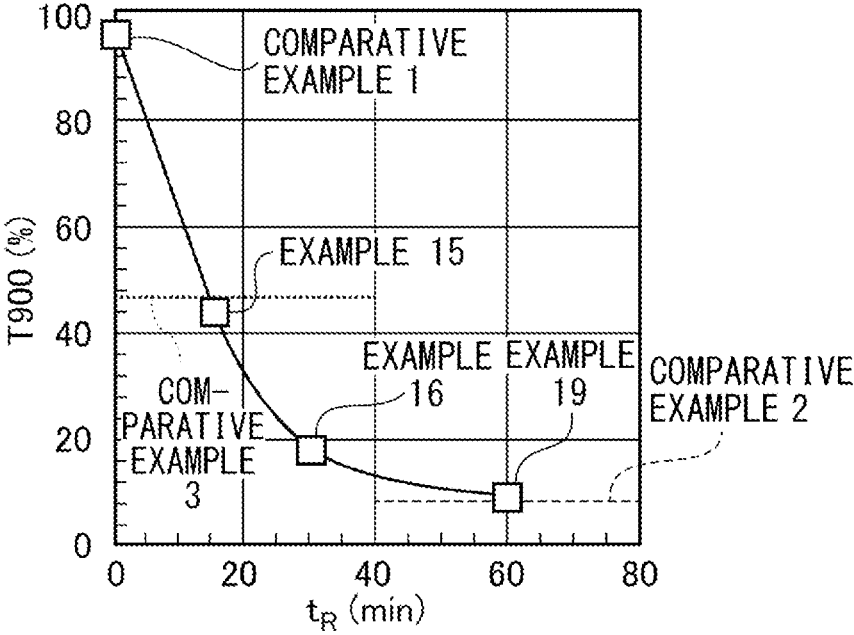
FIG. 11B is a drawing illustrating changes, with the reduction time, in near-infrared absorption properties of the dispersion liquids according to Comparative Example 1 through Comparative Example 3, Example 15, Example 16, and Example 19.

Further, the solar transmittance (ST) of the dispersion liquids in Comparative Example 1 through Comparative Example 3 and Example 15, Example 16, and Example 19 are summarized in FIG. 11A. T900 is summarized in FIG. 11B, and color indices are summarized in FIG. 11C and FIG. 11D. Note that in FIG. 11A through FIG. 11D, $t_R$ in the horizontal axis denotes the reduction time at 800° C. Although only parts of FIG. 11A through FIG. 11D are described, examples with the same $t_R$ are the same experiments.

In FIG. 10A and FIG. 10B, in Comparative Example 1, while the transmittance at the blue wavelengths is low, the transmittance at the red wavelengths is high. Thus, it can be seen that, if Comparative Example 1 is applied to a dispersion film (dispersion), the entire dispersion film looks transparent. Conversely, in Comparative Example 2, while the transmittance at the blue wavelengths is high, the transmittance at the red wavelengths is significantly low. Thus, it can be seen that, if Comparative Example 2 is applied to a dispersion film (dispersion), the entire dispersion film looks bluish.

The dispersion liquids in Example 15, Example 16, and Example 19 are intermediate between the dispersion liquids in Comparative Examples 1 and 2. In the dispersion liquids in Example 15, Example 16, and Example 19, the transmittance at the blue wavelengths tends to gradually increase as the reduction time at 800° C. increases. Conversely, the transmittance at the red wavelengths tends to rapidly decrease as the near-infrared absorption increases. In Example 19, at a reduction time of 60 minutes at 800° C., the transmittance profile of Example 19 is close to that of Comparative Example 2. However, while the transmittance at the red wavelengths of Example 19 is similar to that of Comparative Example 2, the transmittance at the blue wavelengths is lower than that of Comparative Example 2, and thus it can be seen that, even with the same VLT value, an electromagnetic wave absorbing film in Example 19 exhibits a more neutral color tone.

In FIG. 11A, it was confirmed that, at a reduction time of more than 20 minutes, the dispersion liquids in Example 16 and Example 19 exhibited superior solar shielding effects to that of the dispersion liquid in Comparative Example 3 in which ITO was used. In addition, at a reduction time of 60 minutes at 800° C., the solar shielding effects of the dispersion liquids were nearly the same as that of the dispersion liquid in Comparative Example 2 in which conventional $Cs_{0.33}WO_3$ was used.

Figure 11C:
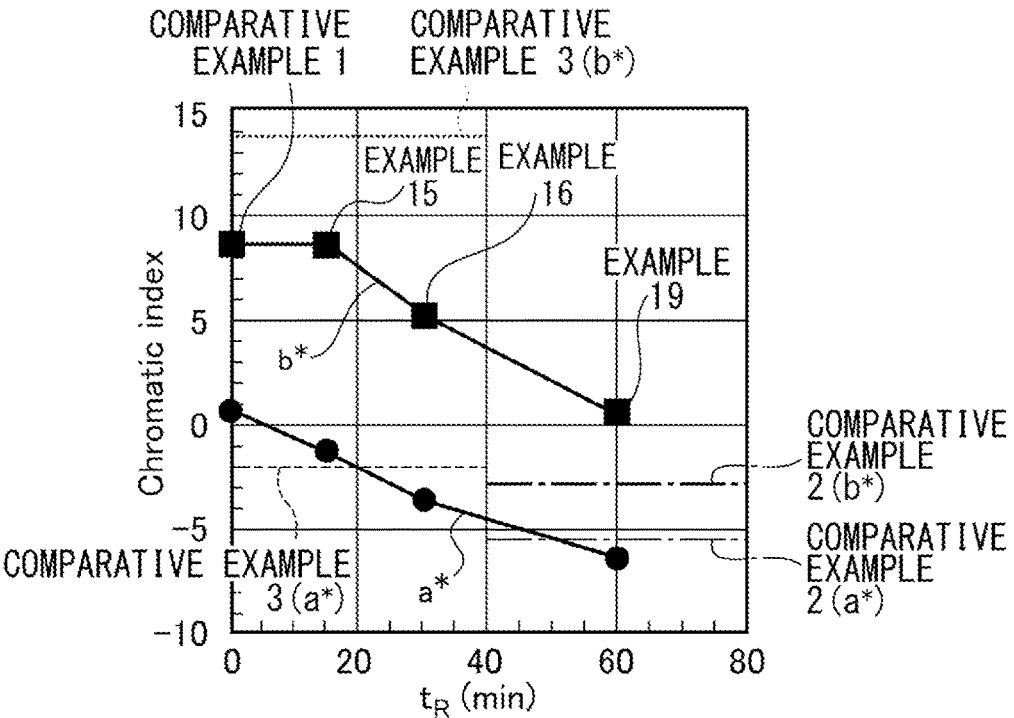
FIG. 11C is a drawing illustrating changes, with the reduction time, in color indices of the dispersion liquids according to Comparative Example 1 through Comparative Example 3, Example 15, Example 16, and Example 19.
Figure 11D:
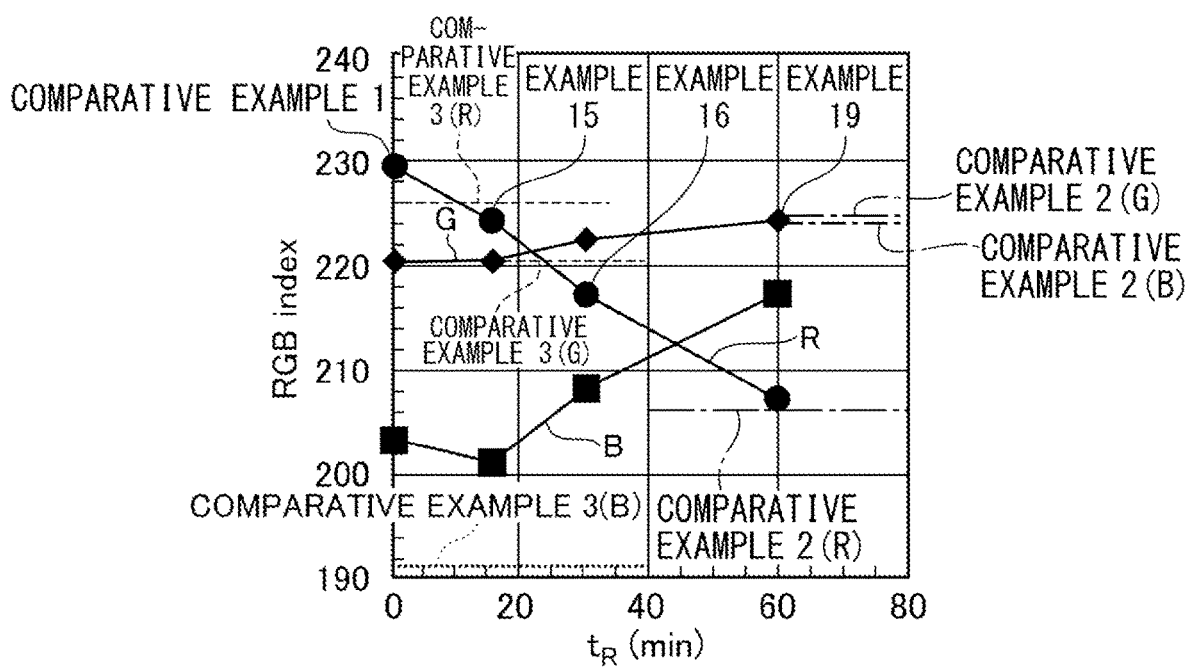
FIG. 11D is a drawing illustrating changes, with the reduction time, in color indices of the dispersion liquids according to Comparative Example 1 through Comparative Example 3, Example 15, Example 16, and Example 19.

Up to a reduction time of approximately 30 minutes at 800° C., the b* values and the B values of the color indices illustrated in FIG. 11C and FIG. 11D are greatly improved and indicate neutral colors as compared to those of the dispersion liquid in Comparative Example 2 in which conventional $Cs_{0.33}WO_3$ was used.

Example 21 Through Example 24

The powder H through the powder K produced in Example 8 through Example 11 were dispersed and pulverized in the same manner as Example 14 to obtain a dispersion liquid H through a dispersion liquid K.

The dispersed particle diameter, optical properties, and color indices of each of the dispersion liquids are depicted in Table 2. Molar absorption coefficient profiles are depicted in FIG. 9C. For each of the dispersion liquids, the reduction time at 650° C. to 950° C. differs. It can be seen that as the degree of reduction of particles at a high temperature increases, the near-infrared absorption increases, and the transmission color tends to become blue. However, it was confirmed that the color tone of each of the dispersion liquids was close to a neutral color.

It was confirmed that a blue transmission color tendency and a near-infrared absorption effect are in a trade-off relationship and it is preferable to select an appropriate degree of high-temperature reduction depending on the application.

Examples 25 and 26

The powder L and the powder M produced in Examples 12 and 13 were dispersed and pulverized in the same manner as Example 14 to obtain a dispersion liquid L and a dispersion liquid M.

The dispersed particle diameter, optical properties, and color indices of each of the dispersion liquids are depicted in Table 2. The raw material powders of these dispersion liquids are the $Cs_4W_{11}O_{35}$ powder including $Cs_6W_{11}O_{36}$ and the $Cs_4W_{11}O_{35}$ powder including $Cs_2W_6O_{19}$, and thus, the compositions and structures slightly differ. However, the phase transformation from an orthorhombic phase to a hexagonal phase due to high-temperature reduction is basically the same between the dispersion liquids. Accordingly, it is considered that the characteristics of an electromagnetic wave absorbing film depend mainly on high-temperature reduction conditions.

That is, even if the raw material powder tungsten oxide $Cs_2O.nWO_3$ including Cs and W is changed in the range of $3.6 \leq n \leq 9.0$, the near-infrared absorption increases and the transmission color tends to become blue as the degree of reduction of particles at a high temperature increases. A blue transmission color tendency and a near-infrared absorption effect are in a trade-off relationship, and an appropriate degree of high-temperature reduction can be selected depending on the application.

TABLE 1

| | POWDER | STARTING MATERIAL (MOLAR RATIO) | | | HEATING AND REDUCING PROCESS | | CHEMICAL ANALYSIS COMPOSITION (at %) | | | COMPOSITION RATIO WHEN W = 1 | | | X-RAY DIFFRACTION MEASUREMENT RESULTS | |
|---|---|---|---|---|---|---|---|---|---|---|---|---|---|---|
| | | Cs | W | O | TEMPERATURE (° C.) | TIME (MINUTE) | Cs | W | O | Cs | W | O | PATTERN | c-AXIS (Å)(H) |
| EXAMPLE 1 | A | 4 | 11 | 35 | 800 | 5 | 9.18 | 23.4 | 67.4 | 0.4 | 1.0 | 2.9 | R + H | 7.5752 |
| EXAMPLE 2 | B | 4 | 11 | 35 | 800 | 15 | 9.16 | 24.6 | 66.2 | 0.4 | 1.0 | 2.7 | R + H | 7.5940 |
| EXAMPLE 3 | C | 4 | 11 | 35 | 800 | 30 | 9.27 | 25.0 | 65.8 | 0.4 | 1.0 | 2.6 | R + H | 7.6107 |
| EXAMPLE 4 | D | 4 | 11 | 35 | 800 | 35 | 9.25 | 24.9 | 65.9 | 0.4 | 1.0 | 2.6 | R + H | 7.6121 |
| EXAMPLE 5 | E | 4 | 11 | 35 | 800 | 40 | 9.29 | 24.9 | 65.8 | 0.4 | 1.0 | 2.6 | H | 7.6118 |
| EXAMPLE 6 | F | 4 | 11 | 35 | 800 | 60 | 9.30 | 25.3 | 65.4 | 0.4 | 1.0 | 2.6 | H | 7.6121 |
| EXAMPLE 7 | G | 4 | 11 | 35 | 800 | 90 | 9.27 | 25.0 | 65.8 | 0.4 | 1.0 | 2.6 | H | 7.6119 |
| EXAMPLE 8 | H | 4 | 11 | 35 | 650 | 120 | 9.17 | 23.6 | 67.2 | 0.4 | 1.0 | 2.8 | R + H | 7.5765 |
| EXAMPLE 9 | I | 4 | 11 | 35 | 700 | 60 | 9.19 | 24.2 | 66.6 | 0.4 | 1.0 | 2.8 | R + H | 7.5829 |
| EXAMPLE 10 | J | 4 | 11 | 35 | 900 | 10 | 9.26 | 25.0 | 65.7 | 0.4 | 1.0 | 2.6 | H | 7.5917 |
| EXAMPLE 11 | K | 4 | 11 | 35 | 950 | 20 | 9.28 | 25.2 | 65.5 | 0.4 | 1.0 | 2.6 | H | 7.6115 |
| EXAMPLE 12 | L | 6 | 11 | 36 | 800 | 30 | 10.30 | 23.9 | 65.8 | 0.4 | 1.0 | 2.8 | R + H | 7.6027 |
| EXAMPLE 13 | M | 2 | 6 | 19 | 800 | 30 | 8.97 | 25.4 | 65.6 | 0.4 | 1.0 | 2.6 | R + H | 7.6081 |

TABLE 2

| | DISPERSED PARTICLE | DISPERSION LIQUID SPECTRAL PROPERTIES | | | | | | | |
| DISPERSION LIQUID | DIAMETER (nm) | VLT (%) | ST (%) | L* | a* | b* | R | G | B |
|---|---|---|---|---|---|---|---|---|---|
| EXAMPLE 14 | A | 26.4 | 72.32 | 53.28 | 87.91 | −1.26 | 8.52 | 224 | 220 | 201 |
| EXAMPLE 15 | B | 31.4 | 72.35 | 39.84 | 88.04 | −3.66 | 5.18 | 217 | 222 | 208 |
| EXAMPLE 16 | C | 29.3 | 72.33 | 37.45 | 88.11 | −4.07 | 4.34 | 215 | 222 | 210 |
| EXAMPLE 17 | D | 25.7 | 72.31 | 36.02 | 88.14 | −4.51 | 3.36 | 214 | 223 | 211 |
| EXAMPLE 18 | E | 31.1 | 72.33 | 33.47 | 88.20 | −6.43 | 0.50 | 207 | 224 | 217 |
| EXAMPLE 19 | F | 23.4 | 72.32 | 34.91 | 88.19 | −6.15 | 0.78 | 208 | 223 | 217 |
| EXAMPLE 20 | G | 24.5 | 72.34 | 34.26 | 88.20 | −6.34 | 0.65 | 208 | 224 | 218 |
| EXAMPLE 21 | H | 28.6 | 72.57 | 58.03 | 88.04 | −0.89 | 8.58 | 225 | 220 | 201 |
| EXAMPLE 22 | I | 29.8 | 72.68 | 56.31 | 88.06 | −0.88 | 9.27 | 226 | 220 | 200 |
| EXAMPLE 23 | J | 30.1 | 73.06 | 35.81 | 88.47 | −5.18 | 2.53 | 213 | 224 | 214 |
| EXAMPLE 24 | K | 26.2 | 73.37 | 34.15 | 88.69 | −6.50 | 0.67 | 209 | 226 | 218 |
| EXAMPLE 25 | L | 34.6 | 72.41 | 39.85 | 88.08 | −3.72 | 4.88 | 217 | 222 | 208 |
| EXAMPLE 26 | M | 31.7 | 72.65 | 38.70 | 88.06 | −3.84 | 4.41 | 216 | 222 | 209 |
| COMPARATIVE EXAMPLE 1 | N | 30.3 | 72.32 | 77.89 | 87.87 | 0.74 | 8.86 | 228 | 218 | 201 |
| COMPARATIVE EXAMPLE 2 | O | 25.8 | 72.33 | 35.48 | 88.29 | −5.52 | −2.89 | 206 | 224 | 217 |
| COMPARATIVE EXAMPLE 3 | P | 35.4 | 72.33 | 45.94 | 87.78 | −2.04 | 13.68 | 226 | 220 | 191 |

The electromagnetic wave absorbing particles, the electromagnetic wave absorbing particle dispersion liquid, and the method for manufacturing electromagnetic wave absorbing particles have been described above in the embodiments, examples, and the like; however, the present invention is not limited to the above-described embodiment, examples, and the like. Various modifications and changes may be made within the scope of the gist of the present invention described in the claims.

This application is based on and claims priority to Japanese Patent Application No. 2020-015756, filed on Jan. 31, 2020, the entire contents of which are incorporated herein by reference.

The invention claimed is:

1. Electromagnetic wave absorbing particles comprising, cesium tungsten oxide represented by a general formula $$Cs_x W_{1-y} O_{3-z},$$

wherein $0.2 \leq x \leq 0.4$, $0 < y \leq 0.4$, and $0 < z \leq 0.46$, and wherein the cesium tungsten oxide includes a mixture of a crystalline phase having an orthorhombic structure and a crystalline phase having a hexagonal structure.

2. The electromagnetic wave absorbing particles according to claim 1, wherein the cesium tungsten oxide has a linear defect or a planar defect in one or more planes selected from an orthorhombic (010) plane, a {100} plane that is a hexagonal prism plane, and a (001) plane that is a hexagonal basal plane.

3. The electromagnetic wave absorbing particles according to claim 1, wherein the cesium tungsten oxide has a defect, and the defect includes a tungsten defect.

4. The electromagnetic wave absorbing particles according to claim 1, wherein, in W—O octahedra forming the orthorhombic crystal structure or the hexagonal crystal structure of the cesium tungsten oxide, part of O is randomly removed.

5. The electromagnetic wave absorbing particles according to claim 1, wherein a c-axis length of the cesium tungsten oxide is 7.560 Å or more and 7.750 Å or less when expressed in hexagonal terms.

6. The electromagnetic wave absorbing particles according to claim 1, wherein part of Cs in the cesium tungsten oxide is substituted with an additive element, and the additive element includes one or more elements selected from Na, Tl, In, Li, Be, Mg, Ca, Sr, Ba, Al, and Ga.

7. The electromagnetic wave absorbing particles according to claim 1, wherein the electromagnetic wave absorbing particles have an average particle diameter of 0.1 nm or more and 200 nm or less.

8. The electromagnetic wave absorbing particles according to claim 1, wherein surfaces of the electromagnetic wave absorbing particles are modified with a compound containing one or more elements selected from Si, Ti, Zr, and Al.

9. The electromagnetic wave absorbing particles according to claim 1, wherein the electromagnetic wave absorbing particles are obtained by heating and reducing a crystalline powder of a cesium tungsten oxide precursor $nCs_2O.mWO_3$ [(n and m are integers, and $3.6 \leq m/n \leq 9.0$)] at a temperature in a range of 650° C. to 950° C. in a reducing gas atmosphere, and wherein n and m are integers, and $3.6 \leq m/n \leq 9.0$.

10. The electromagnetic wave absorbing particles according to claim 1, wherein the electromagnetic wave absorbing particles are particles obtained by heating and reducing a cesium tungsten oxide precursor including a $Cs_4W_{11}O_{35}$ phase as a main phase at a temperature in a range of 650° C. to 950° C. in a reducing gas atmosphere.

11. An electromagnetic wave absorbing particle dispersion liquid comprising:

the electromagnetic wave absorbing particles according to claim 1; and a liquid medium, the liquid medium being one or more kinds selected from water, an organic solvent, fat and oil, a liquid resin, and a liquid plasticizer, wherein the electromagnetic wave absorbing particles are dispersed in the liquid medium.

12. The electromagnetic wave absorbing particle dispersion liquid according to claim 11, wherein a content of the electromagnetic wave absorbing particles is 0.01 mass % or more and 80 mass % or less.

13. A method for manufacturing the electromagnetic wave absorbing particles according to claim 1, the method comprising:

a heating and reducing process for heating and reducing a crystalline powder of a cesium tungsten oxide precursor $nCs_2O.mWO_3$[(n and m are integers, and $3.6 \leq m/n \leq 9.0$)] at a temperature in a range of 650° C. to 950° C. in a reducing gas atmosphere, and wherein n and m are integers, and $3.6 \leq m/n \leq 9.0$;

a pulverization process for pulverizing a powder obtained by the heating and reducing process.

\* \* \* \* \*